US012620386B1

(12) United States Patent
Woodruff et al.

(10) Patent No.: US 12,620,386 B1
(45) Date of Patent: May 5, 2026

(54) SYNTHESIZING PERSONALIZED SPEECH THROUGH ADAPTIVE EXCITATION SIGNAL GENERATION

(71) Applicant: Incentmed IP, LLC, Traverse City, MI (US)

(72) Inventors: John Woodruff, Traverse City, MI (US); James E. Kemler, Glen Arbor, MI (US); Gina Vess, Wake Forest, NC (US); Sam Altonji, Salem, OR (US)

(73) Assignee: INCENTMED IP, LLC, Traverse City, MI (US)

( * ) Notice: Subject to any disclaimer, the term of this patent is extended or adjusted under 35 U.S.C. 154(b) by 0 days.

(21) Appl. No.: 19/352,743

(22) Filed: Oct. 8, 2025

(51) Int. Cl.
*G10L 13/02* (2013.01)
*G10L 13/027* (2013.01)
*G10L 13/04* (2013.01)

(52) U.S. Cl.
CPC ............ *G10L 13/027* (2013.01); *G10L 13/04* (2013.01)

(58) Field of Classification Search
CPC ....... G10L 13/02; G10L 13/027; G10L 19/08; G10L 25/78; A61F 2/20; A61B 5/4064
See application file for complete search history.

(56) References Cited

U.S. PATENT DOCUMENTS 4,274,162 A 6/1981 Joy et al.
5,326,349 A 7/1994 Baraff
5,787,398 A 7/1998 Lowry
6,487,531 B1 * 11/2002 Tosaya .................... G10L 15/20 704/223
6,795,807 B1 9/2004 Baraff
7,675,429 B2 * 3/2010 Cernasov ................ G10L 17/26 340/5.1
9,129,595 B2 9/2015 Russell et al.
9,424,842 B2 8/2016 Liu et al.
9,905,240 B2 2/2018 Levitt (Continued)

FOREIGN PATENT DOCUMENTS

CN 116580690 A 8/2023
CN 119068861 A 12/2024

(Continued)

OTHER PUBLICATIONS

"AI System Helps Analyze "Substitute" Voices After Laryngectomy," Technology Networks Informatics, published Nov. 30, 2022. https://www.technologynetworks.com/informatics/news/ai-system-helps-analyze-substitute-voices-after-laryngectomy-368005.

(Continued)

*Primary Examiner* — Daniel Abebe
(74) *Attorney, Agent, or Firm* — Aurora Consulting LLC

(57) ABSTRACT

A speech synthesis system is described and may include at least one microphone; a speaker; a sensing system, and memory storing processor-executable instructions, which when executed by the processor, cause the processor to: detect speech-related signals emanating from the subject; generate a variable excitation signal; shape the generated variable excitation signal according to previously stored speech recordings; and cause, from the speaker and based on the shaped variable excitation signal, produced speech content that approximates the matched one or more voice characteristics in the previously stored speech recordings.

21 Claims, 10 Drawing Sheets

(56) References Cited

U.S. PATENT DOCUMENTS

| | | | |
|---|---|---|---|
| 9,990,859 B2 | 6/2018 | Salamini et al. | |
| 11,076,950 B2 | 8/2021 | Panetta et al. | |
| 11,393,447 B2 | 7/2022 | Chae | |
| 11,495,206 B2 | 11/2022 | Daido | |
| 11,705,105 B2 | 7/2023 | Chae | |
| 11,854,566 B2 | 12/2023 | Leider | |
| 2004/0024455 A1 | 2/2004 | de Vries et al. | |
| 2011/0190881 A1* | 8/2011 | Russell | G10L 13/02 623/9 |
| 2012/0150544 A1 | 6/2012 | McLoughlin et al. | |
| 2017/0125009 A1* | 5/2017 | Al Ahmad | G10L 13/04 |
| 2022/0208173 A1* | 6/2022 | Chang | G10L 13/027 |
| 2022/0208194 A1 | 6/2022 | Rameau et al. | |
| 2023/0154450 A1* | 5/2023 | Murai Von Bünau | G10L 21/00 704/259 |
| 2023/0404747 A1* | 12/2023 | Ahmadi | G10L 21/0208 |
| 2024/0005944 A1 | 1/2024 | Baraff et al. | |
| 2025/0006190 A1* | 1/2025 | Stavisky | A61B 5/686 |
| 2025/0252958 A1* | 8/2025 | Chang | G10L 15/24 |

FOREIGN PATENT DOCUMENTS

| | | | |
|---|---|---|---|
| CN | 119380695 A | | 1/2025 |
| DE | 102009023924 A1 | | 12/2010 |
| JP | 2839983 B2 | * | 12/1998 |
| JP | 2022158755 A | | 10/2022 |
| WO | 2021050155 A1 | | 3/2021 |

OTHER PUBLICATIONS

Uloza, et al., "An Artificial Intelligence-Based Algorithm for the Assessment of Substitution Voicing," Applied Sciences, 12(19), 9748, (2022). https://doi.org/10.3390/app12199748.

* cited by examiner

SYNTHESIZING PERSONALIZED SPEECH THROUGH ADAPTIVE EXCITATION SIGNAL GENERATION

INCORPORATION BY REFERENCE

All publications and patent applications mentioned in this specification are herein incorporated by reference in their entirety, as if each individual publication or patent application was specifically and individually indicated to be incorporated by reference in its entirety.

TECHNICAL FIELD

This disclosure relates generally to the field of speech synthesis, and more specifically to the field of voice restoration mimicry in subjects having vocal cord impairments.

BACKGROUND

Speech synthesis technology has evolved with the development of text-to-speech systems and voice conversion methods. Traditional electrolarynx devices provide basic voice replacement for patients with vocal cord damage and/or irreversible loss of voice, but produce robotic, monotone speech with no temporal variation in harmonics.

SUMMARY

There is a need for new and useful systems and methods for synthesizing personalized voices that map to a human vocal range and sound to recreate a natural voice of a subject. The systems described herein may synthesize personalized voices using training recordings, with systems like text-to-speech synthesis and voice conversion demonstrating regular patterns in excitation sequences when provided with linguistic information. A source-filter model of speech production may be used to identify that speech is generated by an excitation signal from the vocal folds, which may then be refined into intelligible speech by the oropharynx and/or the oral cavity through the tongue, palate, and lips. The described techniques relate to improved methods, systems, devices, and apparatuses that support techniques for generating personalized speech signals with real-time intonation and voice matching.

In some aspects, the techniques described herein relate to a speech synthesis system including: at least one microphone; a speaker configured to be positioned within an oral cavity of a subject; a sensing system configured to detect speech-related signals; at least one processor operatively coupled to the sensing system, the speaker, and memory storing processor-executable instructions, which when executed by the processor, cause the processor to: detect, using the sensing system, speech-related signals emanating from the subject; generate, based on the detected speech-related signals emanating from the subject, a variable excitation signal, the generating including: automatically varying an excitation signal over time and predicting an upcoming trajectory of fundamental frequencies associated with the excitation signal, and adjusting the predicted fundamental frequencies associated with the excitation signal at predetermined time intervals to capture natural intonation patterns for the subject; shape the generated variable excitation signal according to previously stored speech recordings, the shaping including comparing the generated variable excitation signal to match one or more voice characteristics in the previously stored speech recordings; and cause, from the speaker and based on the shaped variable excitation signal, produced speech content that approximates the matched one or more voice characteristics in the previously stored speech recordings.

In some aspects, the techniques described herein relate to a system, wherein the speaker is a straw conduit configured to audibly transmit the produced speech content into the oral cavity of the subject.

In some aspects, the techniques described herein relate to a system, wherein predicting the upcoming trajectory includes: using a first machine learning model to predict an initial excitation state corresponding to a state of the trajectory of one or more of the predicted fundamental frequencies, the states including an inactive state, an unvoiced state, and a voiced state; and using a second machine learning model to predict a pitch sequence when the excitation state is predicted to be voiced.

In some aspects, the techniques described herein relate to a system, predicting the upcoming trajectory includes determining upcoming time periods in which the variable excitation signal is to include white noise with a lack of a fundamental frequency.

In some aspects, the techniques described herein relate to a system, wherein the at least one microphone is positioned to detect acoustic signals from speech attempts performed by the subject, and wherein the system further includes: at least one sensor positioned on the subject to detect physiological indicators of speech initiation.

In some aspects, the techniques described herein relate to a system, wherein the at least one sensor is configured to detect movement associated with one or more anatomical structures of the subject and generate control signals for activating and deactivating the speaker and the at least one microphone.

In some aspects, the techniques described herein relate to a system, wherein the predetermined time intervals are about 5 milliseconds to about 50 milliseconds.

In some aspects, the techniques described herein relate to a system, wherein the previously stored speech recordings correspond to one or more of: digital audio recordings of speech produced by the subject, digital audio recordings of speech produced by subjects other than the subject, a combination of the digital audio recordings of speech produced by the subject and the digital audio recordings of speech produced by subjects other than the subject.

In some aspects, the techniques described herein relate to a computer-implemented method for generating a personalized excitation signal for a subject, the method including: detecting acoustic signals from an oral cavity of the subject; processing the detected signals through at least one artificial intelligence algorithm trained on banked speech corresponding to the subject; predicting upcoming excitation signals based on the processed signals, the predicting including processing the signals in temporal segments and determining excitation signal parameters for subsequent temporal segments; generating, based on the predicting, new excitation signals acoustically shaped according to one or more characteristics in the banked speech corresponding to the subject; and causing production of speech according to the new excitation signals, wherein the produced speech substantially matches patterns and intonation in the banked speech.

In some aspects, the techniques described herein relate to a computer-implemented method, wherein causing the production of speech includes emission of the produced speech as output through an intraoral speaker provided in the oral cavity of the subject.

In some aspects, the techniques described herein relate to a computer-implemented method, wherein predicting the upcoming excitation signals includes: comparing the detected acoustic signals to one or more characteristics in the banked speech corresponding to the subject; and minimizing differences between the generated speech and the one or more characteristics in the banked speech corresponding to the subject.

In some aspects, the techniques described herein relate to a computer-implemented method, wherein the one or more characteristics include at least one of: audio characteristics in voice recordings captured from the subject prior to a medical procedure; and voice characteristics selected from a voice library.

In some aspects, the techniques described herein relate to a computer-implemented method, wherein detecting the acoustic signals from the oral cavity are performed by a sensing system including: a microphone positioned to detect acoustic signals from speech attempts performed by the subject; and at least one sensor positioned on the subject to detect physiological indicators of speech initiation.

In some aspects, the techniques described herein relate to a computer-implemented method, wherein the at least one sensor is positioned in a neck region or a jaw region on the subject, the at least one sensor being configured to detect movement associated with one or more anatomical structures of the oral cavity of the subject, and generate control signals for activating and deactivating a speaker and a microphone, wherein the speaker and the microphone are within a predetermined range of the neck region or the jaw region of the subject.

In some aspects, the techniques described herein relate to a computer-implemented method for generating speech from brain signals of a subject, the method including: detecting, based on a brain-computer interface coupled to the subject, neural signals associated with intended speech from the subject; decoding intended speech content from the detected neural signals; predicting, based on the decoded intended speech content, an excitation signal for use in producing speech corresponding to the intended speech content; generating, based on the predicted excitation signal, a variable excitation signal that automatically changes over time to match intonation patterns associated with the intended speech content; and causing, based on the variable excitation signal, intelligible speech output corresponding to the intended speech content, wherein the intelligible speech output includes the intended speech acoustically shaped according to one or more voice characteristics in banked speech audio recordings of the subject.

In some aspects, the techniques described herein relate to a computer-implemented method, wherein detecting the neural signals includes utilizing a machine learning model trained to recognize neural patterns associated with a plurality of predefined phonemes, words, and speech intentions.

In some aspects, the techniques described herein relate to a computer-implemented method, wherein detecting the neural signals includes: capturing neural data in time blocks representing about 5 to about 50 milliseconds of neural activity associated with the subject; transforming high-rate neural signals into feature vectors suitable for real-time processing; and maintaining processing latency within a limit that preserves natural speech timing and intonation patterns for the subject.

In some aspects, the techniques described herein relate to a computer-implemented method, wherein the generated variable excitation signal includes multiple harmonic components configured to simulate spectral characteristics of natural vocal fold vibration for the intended speech content.

In some aspects, the techniques described herein relate to a computer-implemented method, further including: comparing the intelligible speech output with predefined speech characteristics corresponding to the intended speech content and the banked speech audio recordings; and adjusting the generated variable excitation signal based on the comparing.

In some aspects, the techniques described herein relate to a computer-implemented method, wherein predicting the excitation signals includes: automatically adjusting a fundamental frequency of the variable excitation signal at predetermined time intervals of about 5 milliseconds to about 50 milliseconds to capture natural intonation patterns associated with the intended speech content.

In some aspects, the techniques described herein relate to a computer-implemented method, wherein causing the intelligible speech output includes emission of the produced speech as output through an intraoral speaker provided in an oral cavity of the subject.

The details of one or more embodiments are set forth in the accompanying drawings and the description below. Other features will be apparent from the description and drawings, and from the claims.

BRIEF DESCRIPTION OF THE DRAWINGS

The foregoing is a summary, and thus, necessarily limited in detail. The above-mentioned aspects, as well as other aspects, features, and advantages of the present technology are described below in connection with various embodiments, with reference made to the accompanying drawings.

Figure 1:
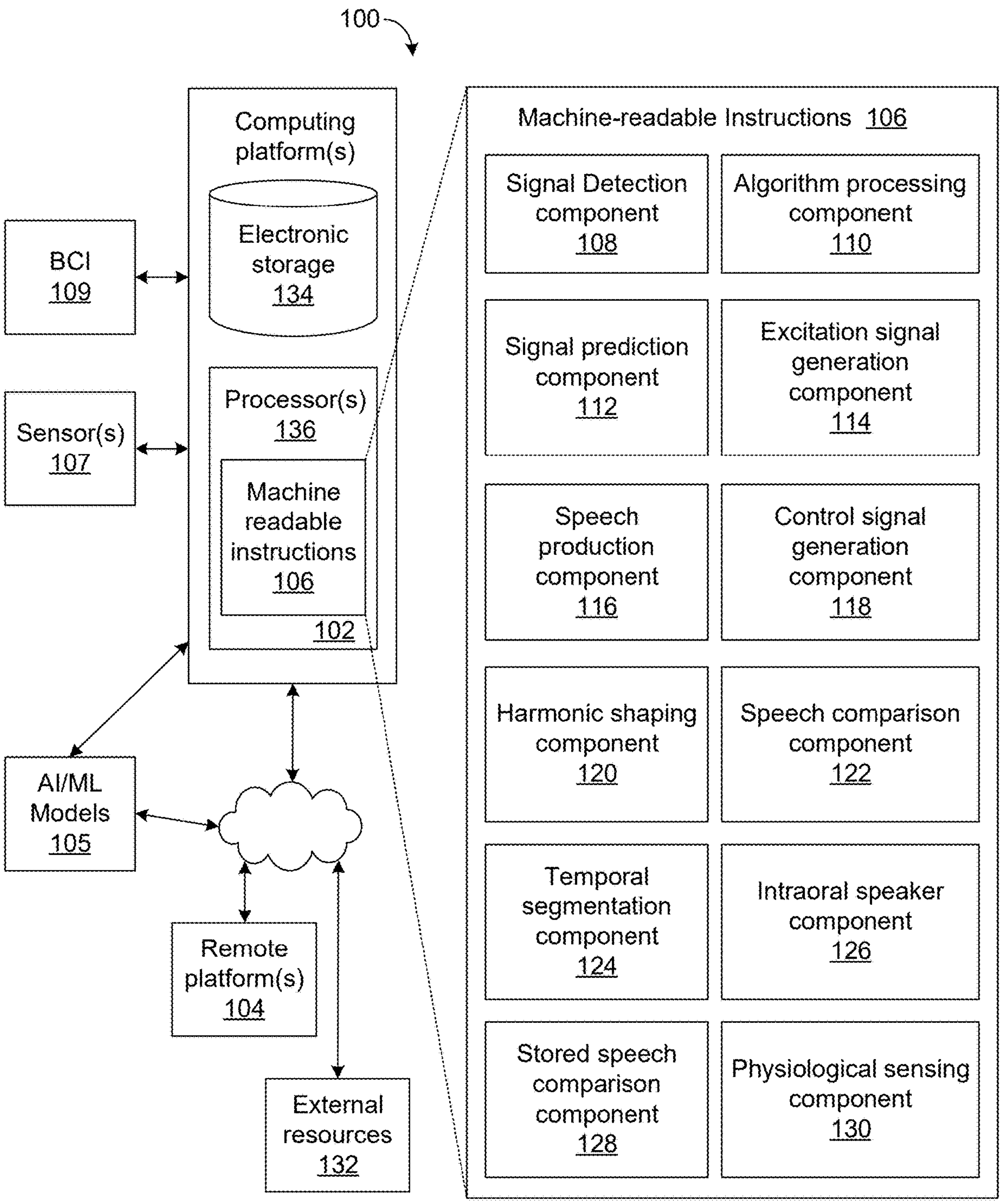
FIG. 1 illustrates an example of a system for generating personalized speech through adaptive excitation signals.

The illustrated embodiments are merely examples and are not intended to limit the disclosure. The schematics are drawn to illustrate features and concepts and are not necessarily drawn to scale.

DETAILED DESCRIPTION

The foregoing is a summary, and thus, necessarily limited in detail. The above-mentioned aspects, as well as other aspects, features, and advantages of the present technology will now be described in connection with various embodiments. The inclusion of the following embodiments is not intended to limit the disclosure to these embodiments, but rather to enable any person skilled in the art to make and use the claimed subject matter. Other embodiments may be utilized, and modifications may be made without departing from the spirit or scope of the subject matter presented herein. Aspects of the disclosure, as described and illustrated herein, can be arranged, combined, modified, and designed in a variety of different formulations, all of which are explicitly contemplated and form part of this disclosure.

The systems and methods described herein may utilize a speech synthesis system designed to address the limitations of existing technologies by incorporating a sensing system, a processor, at least one microphone, and a speaker positioned within the oral cavity of a subject (e.g., user, patient, etc.). The sensing system may detect speech-related signals emanating from the subject, including acoustic signals and physiological indicators of speech initiation. These signals may be processed using a machine learning-based system or other algorithm programmed system that predicts excitation signal trajectories, enabling the generation of variable excitation signals that dynamically adapt to speech patterns associated with the subject.

In some embodiments, the systems and methods described herein may utilize advanced machine learning models, including neural networks, to predict upcoming excitation states and pitch sequences based on the detected signals. The generated excitation signals may be shaped to match stored voice characteristics derived from pre-recorded audio samples, ensuring that the synthesized speech closely approximates a natural voice associated with a particular subject. The speaker, positioned within the oral cavity, may produce intelligible speech output in real-time, resonating through the vocal tract of the subject to achieve natural intonation and voice quality. Such systems and methods may provide a transformative solution for individuals with impaired vocal function, enabling personalized and intelligible speech synthesis that adapts dynamically to needs of a subject.

The systems and methods described herein include a speech synthesis system that may utilize artificial intelligence (AI) and machine learning (ML) algorithms to predict and generate personalized excitation signals for users with vocal cord impairments. The AI and/or ML models may be trained on banked speech (e.g., previously recorded speech) as a basis in which to predict and generate the personalized excitation signals for a particular user. The banked speech recordings may be user-specific, multiple user specific, or general recorded or generated speech. The predicted personalized excitation signals may be used to replace affected or otherwise modified speech with natural-sounding speech for users with vocal cord impairments. For example, the systems described herein may automatically predict a fundamental frequency every about 5 to about 10 milliseconds (ms) to attempt to mimic (e.g., substantially match) patterns from previously stored speech associated with the user being assessed for voice generation. Such predictions may be used to enable generation of speech that has a natural intonation and harmonics that substantially match the intonation and harmonics of a natural voice of the user. A natural voice may be a recorded voice of the user stored before a modification occurred to the pharynx, oral cavity, neck, or other portion of the body involved in speech generation and audial output from a human.

The generated excitation signals may be acoustically shaping according to one or more voice characteristics of previously stored speech for a particular user. Unlike conventional electrolarynx devices that utilize manual adjustments, the disclosed system automatically changes excitation signals over time using the predictive AI algorithms and/or ML models that leverage multiple sensor inputs to generate personalized speech that mimics a natural voice associated with the user.

Conventional speech synthesis systems may lack the ability to dynamically generate excitation signals that accurately reflect the natural voice characteristics of a user in real-time. These systems may often be constrained by static models that fail to account for the variability in speech-related signals or physiological changes in the user. Additionally, current technologies may not integrate sensing systems capable of detecting speech-related signals directly from the user's oral cavity or physiological indicators, limiting the effectiveness of conventional speech synthesis systems in producing intelligible and personalized speech. This deficiency may be particularly pronounced in applications attempting to use real-time speech synthesis for individuals with impaired vocal function, where the inability to adapt to dynamic speech patterns may result in unnatural or unintelligible speech output.

In some embodiments, the systems described herein include a speech synthesis system that includes at least one microphone, a sensing system, an intraoral speaker, and a processor. The systems may detect oral cavity configurations, physiological signals, and neural signals. The processor may generate variable excitation signals by iteratively adjusting fundamental frequencies and harmonics, shaping them according to aspects of previously stored speech recordings. The intraoral speaker may emit the shaped excitation signals leveraging anatomical structures of the oral cavity to enhance resonance and intelligibility. By integrating real-time physiological and neural signals, the systems described herein may dynamically adapt to the user's speech-related activity, capturing natural intonation patterns and spectral characteristics. This approach may enable the production of speech that is both intelligible and personalized, addressing the limitations of existing technologies and providing a transformative solution for individuals seeking effective communication tools.

In some embodiments, the speech synthesis system may include a multimodal BCI-based speech generation system. Such a system may provide several advantages over conventional speech generation systems. First, unlike text-to-speech systems that rely on manual input through a keyboard, touchscreen, or eye-tracking interface, the BCI enables direct translation of neural activity of the user associated with intended speech into an output signal, thereby reducing latency and improving communication speed. Second, by incorporating neural data, the systems described herein may allow users who are unable to produce sufficient motor control for articulating words, or who lack reliable motor pathways, or oral cavity configurations for conventional input, to nonetheless convey speech content.

Another advantage of the systems described herein is that the combination of neural activity with peripheral sensor data, such as microphone signals and movement sensor outputs, improves accuracy and robustness of speech reconstruction. Conventional speech synthesis systems that rely solely on acoustic capture or mechanical movement detection may fail when vocal output is weak or articulatory gestures are incomplete. In contrast, the systems described herein may leverage the redundancy between neural intent and partial peripheral signals to reconstruct intended speech with higher fidelity.

Additionally, the provision of real-time auditory feedback through the speaker supports adaptive user training. This feedback loop allows the brain to refine neural signaling strategies over time, enhancing the accuracy and efficiency of the decoding process. Conventional assistive communication devices often lack this closed-loop neuroadaptive capability.

Finally, because the system described herein is capable of decoding speech content directly from brain activity, it offers a natural and intuitive communication pathway compared to systems using spelling or symbol selection. This enables more fluid, conversational interactions that approximate natural speech, thereby improving the quality of life and social integration for users with severe speech or motor impairments.

Systems and Devices

FIG. 1 illustrates an example of a system 100 for generating personalized speech through adaptive excitation signals. The system 100 may represent a speech synthesis system that may function with one or more sensors, microphones, and/or speakers to generate excitation signals adapted to substantially match stored speech patterns and/or speech characteristics for a particular user (e.g., patient, subject, etc.).

The system 100 may include one or more computing platforms 102. Computing platform(s) 102 may communicate with one or more remote platforms 104 according to a client/server architecture, a peer-to-peer architecture, and/or other architectures. Remote platform(s) 104 may communicate with other remote platforms through computing platform(s) 102 and/or according to a client/server architecture, a peer-to-peer architecture, and/or other architectures.

Computing platform(s) 102 may be programmed with machine-readable instructions 106. Machine-readable instructions 106 may include one or more instruction components. The instruction components may include computer program components. The instruction components may include one or more of: a signal detection component 108, an algorithm processing component 110, a signal prediction component 112, an excitation signal generation component 114, a speech production component 116, a control signal generation component 118, a harmonic shaping component 120, a speech comparison component 122, a temporal segmentation component 124, an intraoral speaker component 126, a stored speech comparison component 128, a physiological sensing component 130 and/or other instruction components.

The signal detection component 108 may represent a means for detecting acoustic signals from an oral cavity of the subject. In some embodiments, the signal detection component 108 may include a microphone positioned to detect acoustic signals generated during speech attempts by the subject. In some embodiments, the signal detection component 108 may be positioned within a predetermined range of the oral cavity to capture acoustic signals with sufficient clarity. For example, one or more microphones may be positioned on one or more of: a neck region, a jaw region, an car or ear canal region, a check region, or the like. In some embodiments, the signal detection component 108 may incorporate noise-canceling technology to reduce interference from ambient sounds. The signal detection component 108 may be designed to detect a range of frequencies corresponding to human speech, which may include both voiced and unvoiced sounds.

The algorithm processing component 110 may represent a means for processing the detected signals through at least one AI algorithm, for example, using one or more AI/ML models 105 that may be trained on banked speech corresponding to the subject. In some embodiments, the AI algorithm may include one or more neural networks designed to analyze temporal patterns in the detected signals. The neural networks may be structured with multiple layers, such as convolutional or recurrent layers, to process complex speech features.

In general, the AI/ML models 105 may utilize particular system architectures. For example, the speech synthesis system 100 may function to generate personalized excitation state sequences that replace the function of damaged vocal folds in users who have undergone laryngectomy or similar procedures. In particular, the system 100 may use AI/ML models 105 to predict and generate the fundamental frequency (e.g., pitch) and voice characteristics that would normally be produced by healthy vocal folds, while allowing the user's remaining articulatory organs (tongue, lips, palate) to shape the sound into intelligible speech.

In some embodiments, the network architecture of one or more AI models 105 may include multiple distinct layer types working in sequence as described in detail elsewhere herein. An encoding layer may transform the dimensionality of the input vector prior to passing through a series of hidden layers, each of which computes its own transformation of the data. The system 100 may utilize the encoding layer to perform linear transformations, followed by hidden layers including convolutional layers (Conv) with batch normalization (BatchNorm) and LeakyReLU activation functions, and recurrent layers implemented as LSTM (Long Short-Term Memory) units.

In some embodiments, the algorithm processing component 110 may represent algorithms that may carry out processes such as process/flow 300, process/flow 400, flow/system 500, flow 600, flow 700, flow 800, process 900, and/or process 1000. In some embodiments, the algorithm processing component 110 may represent AI architecture and/or ML model infrastructure that employs neural network sequence models that operate moment by moment, integrating information in an input sequence to predict a next token of an output sequence. The neural network architecture may perform causal, real-time time-series prediction like excitation state sequence estimation, as described elsewhere herein.

In some embodiments, the AI algorithm may incorporate pre-trained models that may be fine-tuned with the subject's specific speech data. The pre-trained models may include representations that may generalize across different speech data from different speakers while adapting to unique vocal characteristics of a particular subject. In some embodiments, the AI algorithm may utilize clustering techniques to group similar speech patterns from the banked speech data. The clustering techniques may determine representative features that may correspond to phonemes or other linguistic units.

The signal prediction component 112 may represent a means for predicting upcoming excitation signals based on the processed signals from the algorithm processing component 110. The predicting may include processing the signals in temporal segments and determining excitation signal parameters for subsequent temporal segments. In some embodiments, the signal prediction component 112 may analyze temporal segments every about 5 ms to about 50 ms to capture rapid changes in speech dynamics. In some embodiments, the signal prediction component 112 may determine excitation signal parameters by identifying harmonic components within the processed signals and estimating their variation patterns over time. In some embodiments, the signal prediction component 112 may incorporate machine learning models 105 trained to recognize patterns in excitation signals associated with natural intonation and pitch trajectories.

The excitation signal generation component 114 may represent a means for generating, based on the predicting, new excitation signals acoustically shaped according to one or more voice characteristics of previously stored speech recordings for a subject. For example, the excitation signal generation component 114 may determine the spectral envelope of the oral cavity to shape the excitation signals to match the subject's unique vocal tract characteristics. In some embodiments, the excitation signal generation component 114 may incorporate aperiodicity vectors to blend harmonic and noise components for a more natural acoustic output. In some embodiments, the excitation signal generation component 114 may adjust the harmonic structure of the excitation signals to align with banked speech (e.g., the subject's pre-recorded speech patterns).

The speech production component 116 may represent a means for causing production of speech according to the new excitation signals where the produced speech may substantially match patterns and intonation in the banked speech. In some embodiments, the speech production component 116 may be coupled to an intraoral speaker component 126 positioned within an oral cavity of the subject to emit the produced speech. In some embodiments, the speech production component 116 may adjust the amplitude of the produced speech to align with the subject's pre-recorded vocal characteristics. In some embodiments, the speech production component 116 may shape the produced speech to mimic the spectral envelope derived from the subject's training data.

In some embodiments, the intraoral speaker component 126 is or incorporates a straw conduit (e.g., some or all of intraoral speaker component 126) configured to audibly transmit (e.g., deliver) audio output (e.g., produced speech content, sound, etc.) directly into (or substantially near to) the oral cavity of a subject. For example, the speaker component 126 may be a hollow conduit, such as a straw or tubular member, configured to transmit the generated audio. The conduit may extend from a proximal end operatively coupled to the speaker to a distal end portion that is positioned proximate to or within the oral cavity of the subject. During operation, the speaker produces excitation signal shaped output that propagates through the conduit and is emitted as an acoustic excitation source into the oral cavity. In this example, the oral cavity and associated anatomical structures of the subject may function as a natural acoustic resonator to shape the excitation signal/audio output into intelligible speech. By directly introducing the excitation signal into the oral cavity, the straw conduit avoids acoustic attenuation, muffling, and distortion that may result from transcutaneous coupling through scar tissue, fibrosis, or anatomical irregularities. In some embodiments, the straw conduit assembly may improve speech clarity, reduce background noise pickup, and facilitate more consistent resonance compared to conventional electrolarynx devices.

In some embodiments, the conduit may include a flexible, medical-grade polymer tube with a circular cross-section. In some embodiments, the conduit may have a flattened or elliptical cross-section to optimize transmission of sound energy (and/or airflow) and comfort when placed between the lips. The length and diameter of the conduit may be selected to balance acoustic efficiency, case of placement, and user comfort.

In some embodiments, the conduit may further include an acoustic filter, baffle, or impedance matching element disposed within the lumen to improve transmission of audio output. In some embodiments, the conduit may be integrated with a one-way valve and/or saliva guard to enhance user comfort and maintain sanitary conditions. The distal end of the conduit may be shaped with a rounded mouthpiece, flattened extension, or soft tip configured to rest comfortably against the lips or teeth. In some embodiments, the straw conduit assembly may be integrated into a wearable or handheld device. For example, the audio output portion may be housed within a compact body shaped to rest in a hand or mount on a lanyard, while the conduit extends to the mouth of the subject.

Variations in conduit material, geometry, coupling mechanisms, and sanitary features allow the conduit assembly to be tailored to the anatomical needs and comfort preferences of different users, while maintaining the core function of providing a direct intraoral excitation sourced audio for speech production.

The control signal generation component 118 may represent a means for detecting physiological indicators of speech initiation from a subject and generating control signals to activate or deactivate the processing of the detected acoustic signals. For example, the control signal generation component 118 may detect a control signal using one or more sensor devices 107 (and/or optional BCI sensor device 109) placed on, within, or substantially adjacent to a portion of the subject. The control signal may be a movement, an audible sound, a pressure, a vibration change, a command, a tactile input, etc. For example, the control signal generation component 118 may detect, at a sensor device 107 (and/or optional BCI sensor device 109), subtle muscle movements (e.g., a control signal) in a neck region that may correspond to speech initiation attempts. In some embodiments, the sensor device 107 (and/or optional BCI sensor device 109) may detect movement and/or changes associated with oral cavity changes that may correspond to speech activity. In some embodiments, the control signal generation component 118 may incorporate sensor devices 107 (and/or optional BCI sensor device 109) capable of detecting vibrations or pressure changes emitted by the subject that may indicate speech-related activity. In some embodiments, the control signal generation component 118 may utilize multi-axis accelerometer sensor devices 107 to determine movement patterns associated with speech initiation.

The harmonic shaping component 120 may represent a means for shaping the new excitation signals by determining harmonic components and varying their amplitudes to mimic natural vocal fold vibration patterns. In some embodiments, the harmonic shaping component 120 may determine harmonic components by analyzing frequency peaks within the excitation signal and identifying their relative strengths. In some embodiments, the harmonic shaping component 120 may vary the amplitudes of the harmonic components by applying amplitude modulation techniques that may correspond to the subject's pre-recorded vocal characteristics. In some embodiments, the harmonic shaping component 120 may incorporate algorithms that may adjust harmonic amplitudes based on temporal patterns observed in natural speech recordings.

The speech comparison component 122 may represent a means for comparing the produced speech to predefined speech characteristics stored in the banked speech and adjusting the excitation signal parameters to reduce differences between the produced speech and the predefined speech characteristics. In some embodiments, the speech comparison component 122 may determine differences in pitch contours between the produced speech and the predefined speech characteristics and adjust the excitation signal parameters to align the pitch contours. In some embodiments, the speech comparison component 122 may analyze the spectral envelope of the produced speech and modify the excitation signal parameters to match the spectral peaks and valleys of the predefined speech characteristics. In some embodiments, the speech comparison component 122 may evaluate the temporal alignment of phoneme transitions in the produced speech and adjust the excitation signal parameters to synchronize these transitions with the predefined speech characteristics.

In some examples, the temporal segmentation component 124 may represent a means for processing the detected acoustic signals in temporal segments of about 5 ms to about 50 ms to maintain natural speech timing and intonation patterns. In some embodiments, the temporal segmentation component 124 may determine the energy levels within each temporal segment to identify voiced and unvoiced sounds. In some embodiments, the temporal segmentation component 124 may analyze frequency peaks within the temporal segments to detect harmonic structures associated with speech signals. In some embodiments, the temporal segmentation component 124 may incorporate algorithms that may adjust the segmentation duration dynamically based on the detected speech patterns.

The intraoral speaker component 126 may represent a means for causing the production of the speech through an intraoral speaker positioned within the oral cavity and/or pharynx of the subject. In some embodiments, the intraoral speaker component 126 may include a compact design that may fit comfortably within the oral cavity without interfering with natural movements of the tongue or jaw. In some embodiments, the intraoral speaker component 126 may incorporate materials that may resist moisture and saliva to maintain functionality during extended use. In some embodiments, the intraoral speaker component 126 may be designed to emit sound waves that may align with the acoustic properties of the subject's oral cavity to produce clear and intelligible speech.

The intraoral speaker component 126 may represent a means for emission of the produced speech as output through an intraoral speaker provided in the oral cavity of the subject. In some embodiments, the intraoral speaker component 126 may include a design that may accommodate various oral cavity sizes to ensure compatibility across different users. In some embodiments, the intraoral speaker component 126 may incorporate sound-dampening materials to reduce vibrations that may interfere with speech clarity. In some embodiments, the intraoral speaker component 126 may feature a modular structure that may allow for easy replacement or adjustment of individual parts.

The stored speech comparison component 128 may represent a means for predicting the upcoming excitation signals by comparing the detected acoustic signals to stored speech patterns for the subject and minimizing differences between the generated speech and the stored speech patterns. In some embodiments, the stored speech comparison component 128 may analyze pitch contours in the detected acoustic signals and determine adjustments to align these contours with the stored speech patterns. In some embodiments, the stored speech comparison component 128 may evaluate the temporal alignment of phoneme transitions in the detected acoustic signals and adjust excitation signal parameters to synchronize these transitions with the stored speech patterns. In some embodiments, the stored speech comparison component 128 may assess the spectral envelope of the detected acoustic signals and modify excitation signal parameters to match the spectral peaks and valleys of the stored speech patterns.

The stored speech comparison component 128 may utilize stored speech patterns including voice recordings captured from the subject prior to a medical procedure or voice characteristics selected from a voice library. In some embodiments, the stored speech comparison component 128 may determine phoneme-specific acoustic features from the stored voice recordings to match detected speech patterns. In some embodiments, the stored speech comparison component 128 may analyze intonation contours from the stored voice characteristics to align with the subject's natural speech rhythm.

In some embodiments, the stored speech comparison component 128 may incorporate ML models 105 trained on the stored speech patterns to predict adjustments for excitation signal parameters. In some embodiments, the stored speech comparison component 128 may evaluate harmonic structures within the stored voice recordings to determine frequency adjustments for the generated speech. In some embodiments, the stored speech comparison component 128 may assess temporal variations in the stored speech patterns to refine synchronization of phoneme transitions in the produced speech.

The physiological sensing component 130 may represent a means for detecting the acoustic signals from the oral cavity using a sensing system comprising at least one microphone positioned to detect acoustic signals from speech attempts performed by the subject and at least one sensor device 107 positioned on the subject to detect physiological indicators of speech initiation. In some embodiments, the physiological sensing component 130 may include a microphone that may be positioned near the oral cavity to capture acoustic signals with minimal interference from ambient noise. In some embodiments, the physiological sensing component 130 may incorporate a directional microphone that may focus on sound waves emanating from the subject's oral cavity, larynx, etc. to isolate speech-related signals. In some embodiments, the at least one sensor device 107 used by the physiological sensing component 130 may include a pressure sensor that may detect subtle changes in the neck region associated with speech initiation. In some embodiments, the at least one sensor device 107 used by the physiological sensing component 130 may include an electromyography sensor that may detect electrical activity in muscles involved in speech production. In some embodiments, the at least one sensor device 107 used by the physiological sensing component 130 may include an EEG, a brain-based sensor, and/or a brain-computer interface. Such sensors or components may detect neural signals associated with intended speech from the subject. In some embodiments, detect the neural signals may include utilizing an ML model 105 trained to recognize neural patterns associated with any number of predefined phonemes, words, and speech intentions. In some embodiments, detecting the neural signals may include capturing neural data in time blocks representing about 5 to about 50 ms of neural activity associated with the subject, transforming high-rate neural signals into feature vectors suitable for real-time processing, and maintaining processing latency within a limit that preserves natural speech timing and intonation patterns for the subject.

The physiological sensing component 130 may represent a means for positioning at least one sensor device 107 to detect movement associated with one or more anatomical structures of the oral cavity of the subject and/or neck movement and/or muscle movement and generate control signals for activating and deactivating a speaker and a microphone. In some embodiments, the speaker and the microphone may be located within a predetermined range of the neck region or the jaw region of the subject. In some embodiments, the physiological sensing component 130 may include sensors capable of detecting vibrations in the neck region that may correspond to speech initiation attempts. In some embodiments, the physiological sensing component 130 may incorporate multi-axis accelerometers to determine movement patterns associated with speech-related activity. In some embodiments, the physiological sensing component 130 may utilize pressure sensors to detect subtle changes in the jaw region that may indicate speech initiation.

In some embodiments, computing platform(s) 102, remote platform(s) 104, AI/ML models 105, and/or external resources 132 may be operatively linked through one or more electronic communication links. For example, such electronic communication links may be established, at least in part, through a network such as the Internet and/or other networks. It will be appreciated that this is not intended to be limiting, and that the scope of this disclosure includes embodiments in which computing platform(s) 102, remote platform(s) 104, AI/ML models 105, and/or external resources 132 may be operatively linked through other communication media and/or networks.

A given remote platform may include one or more processors for executing computer program components. The computer program components may be configured to enable an expert or user associated with the given remote platform to interface with system 100 and/or external resources 132, and/or provide other functionality attributed herein to remote platform(s) 104. By way of non-limiting example, a given remote platform and/or a given computing platform may include one or more of a smart card, a server, a desktop computer, a laptop computer, a handheld computer, a tablet computing platform, a smartphone, a gaming console, and/or other computing platforms. In some embodiments, the computing platform(s) 102 may include one or more server (s), and the remote platform(s) 104 may include remotely located client computing platform(s).

External resources 132 may include sources of information outside of system 100, external entities participating with system 100, external resources communicatively coupled to system 100, and/or other resources. In some embodiments, some or all of the functionality attributed herein to external resources 132 may be provided by resources included in system 100.

Computing platform(s) 102 may include electronic storage 134, one or more processors 136, and/or other components. Computing platform(s) 102 may include communication lines, or ports to enable the exchange of information with a network and/or other computing platforms. Illustration of computing platform(s) 102 in FIG. 1 is not intended to be limiting. Computing platform(s) 102 may include any amount of hardware, software, and/or firmware components operating together to provide the functionality attributed herein to computing platform(s) 102. For example, computing platform(s) 102 may be implemented by a cloud of computing platforms operating together as computing platform(s) 102.

Electronic storage 134 may include non-transitory storage media that electronically stores information. The electronic storage media of electronic storage 134 may include one or both of system storage that is provided integrally (i.e., substantially non-removable) with computing platform(s) 102 and/or removable storage that is removably connectable to computing platform(s) 102 via, for example, a port (e.g., a USB port, a firewire port, etc.) or a drive (e.g., a disk drive, etc.). Electronic storage 134 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 134 may include one or more virtual storage resources (e.g., cloud storage, a virtual private network, and/or other virtual storage resources). Electronic storage 134 may store software algorithms, AI/ML algorithms and/or models, information determined by processor(s) 136, information received from computing platform(s) 102, information received from remote platform(s) 104, and/or other information that enables computing platform(s) 102 to function as described herein.

Processor(s) 136 may provide information processing capabilities in computing platform(s) 102. As such, processor(s) 136 may include one or more of a digital processor, an analog processor, a digital circuit designed to process information, an analog circuit designed to process information, a state machine, and/or other mechanisms for electronically processing information. Although processor(s) 136 is shown in FIG. 1 as a single entity, this is for illustrative purposes and as such, any number of processors may be utilized and/or function together throughout the systems described herein. Processor(s) 136 may execute system 100 tasks and may execute components 108, 110, 112, 114, 116, 118, 120, 122, 124, 126, 128, 130, and/or other components. Processor(s) 136 may execute components 108, 110, 112, 114, 116, 118, 120, 122, 124, 126, 128, 130, and/or other components by software; hardware; firmware; some combination of software, hardware, and/or firmware; and/or other mechanisms for configuring processing capabilities on processor(s) 136.

The system 100 can include one or more processors 106 coupled to memory (electronic storage 134). The one or more processors 106 may include one or more hardware processors, including microcontrollers, digital signal processors, application specific integrated circuit (ASIC), a field programmable gate array (FPGA) or other programmable logic devices, discrete gate or transistor logic, discrete hardware components, or any combination thereof designed to perform the functions described herein and/or capable of executing instructions, such as instructions stored by the memory. The processors 106 may also execute instructions for performing communications amongst devices described herein.

The memory (electronic storage 134) can include one or more non-transitory computer-readable storage media. The memory may store instructions and data that are usable in combination with processors 106 to execute processes such as process 900 and process 1000. The memory may also function to store or have access to sensor data, commands interacting with sensors, or the like.

The system 100 may further include (or be communicatively coupled to) input devices (not shown), output devices (not shown), and/or one or more power source to such devices. The input devices may interact with one or more processors, memory, and/or sensors. The input devices may include buttons, touchscreens, switches, toggles, and/or other hardware components located on system 100. In some embodiments, the input device may be external to or not integrated into the system 100 such that one or more controllers, mobile device, computing device, etc., may communicate with system 100 using a wireless communications protocol.

In operation, the system 100 may generate a personalized excitation state sequence. The excitation state sequence may be mathematically represented as shown in equation [1]:

$$F_0[\tau]\in\{0 \text{ if silent, } 1 \text{ if unvoiced, } [50,1000] \text{ if voiced}\} \quad [1]$$

where the system 100 determines, for each time frame, whether to generate silence, noise (unvoiced speech), or a harmonic signal with a specific fundamental frequency (voiced speech).

The system 100 may use a vocoder-based approach to create the actual excitation signal from a determined excitation state sequence. This vocoder-based approach allows the system 100 to synthesize high-quality speech signals that can be delivered through a transducer, such as a miniature speaker positioned within the oral cavity of a user.

The system 100 may adapt generative AI speech synthesis methods, such as text-to-speech synthesis (TTS) and/or voice conversion (VC) techniques, to estimate personalized excitation state sequences. These AI systems demonstrate that regular patterns exist in excitation sequences that can be generated when provided with linguistic information. The system 100 may utilize past words spoken by the user, captured through microphones, for example, in addition to signals from other sensors to predict upcoming excitation sequences. In some embodiments, the system 100 may employ a pair of microphones to capture sound when the user speaks, extracting linguistic information even when the excitation signal is artificially generated. In some embodiments, the system 100 may employ a single microphone to capture sound when the user speaks.

In general, the system 100 may process speech data across multiple domains to extract relevant features. For example, the system 100 may process time-domain audio signals that include quantized samples of analog voltage represented between-1 and 1, with hundreds of samples per 10-millisecond time frame. The system 100 may begin with time-domain audio signals in the digital domain. In some embodiments, the system 100 may process speech data by performing time-frequency analysis through spectrograms to reveal energy distribution across frequencies over time. Such processing may provide improved correspondence with human auditory perception. A time-frequency analysis of the signal, called a spectrogram, shows the energy per frequency every small period of time, allowing the system 100 to analyze content and determine a correspondence with human hearing.

The system 100 may perform an energy computation from time-domain audio or spectrograms to enable determination of sound energy per small time period (e.g., approximately 5 ms), with the system 100 distinguishing between speech presence (e.g., approximately −40 to −20 dB range) and background noise levels. The system 100 may also employ auditory spectrograms (e.g., cochleagrams) that integrate energy across linearly-spaced spectrogram channels using triangle-shaped filters spaced on a quasi-logarithmic scale, mimicking the critical bands of human hearing.

The system 100 may utilize pitch tracking using sub-modules of a vocoder to estimate fundamental frequency of speech per time period. The system 100 may then compute excitation states per time period, where 0 corresponds to inactive, 1 to unvoiced (noisy, without pitch), and 2 to voiced (containing pitch). When the excitation state is unvoiced, the system 100 may generate a noisy signal such as pink noise, while voiced states require generation of harmonic signals with appropriate pitch estimation.

In some embodiments, the system 100 may incorporate sophisticated speech representation techniques, including, but not limited to HuBERT (Self-Supervised Speech Representation Learning by Masked Prediction of Hidden Units) embeddings. HuBERT produces 768-dimensional data vectors every 20 ms, but other timing is of course contemplated by one skilled in the art. The data vectors may be designed to be insensitive to excitation signals while maintaining correspondence between pre-surgery training data and post-surgery deployment conditions. To further refine the representation, the system 100 may perform a k-means clustering on HuBERT vectors, using 100 clusters to find 768-dimensional vectors that most effectively represent the data. This tokenization process creates similarity computations between new data vectors and the established clusters, resulting in representations that approximate phoneme probability vectors while remaining insensitive to excitation signals.

In some embodiments, the system 100 may utilize multiple sensing modalities beyond audio input, including ultrasound sensing, motion sensing through 6-axis accelerometer-gyroscope devices, and electro-mechanical sensing. Additional sensing capabilities such as EEG integration are also possible within the system 100 framework. This multi-sensor approach may include pre-processing and feature integration stages that combine different sensor modalities into a single input vector for the excitation sequence generation model. Ultrasound stimulation can be used to sense movement of the jaw, mouth, and lips through changes in acoustic reflection patterns. The excitation state generated by the system 100 may result in an excitation signal that interacts acoustically with the user as it resonates in the vocal tract and nasal cavities.

In some embodiments, the system 100 uses a training process involves creating two distinct representations from speech recordings: one that ignores the excitation signal and another that extracts excitation signal information. The representation that removes excitation information may be designed to be similar to what can be observed post-surgery when the device is deployed, serving as input to the model during training. The excitation state sequence representation serves as the model target during training, resulting in a model that generates excitation state sequences in response to incoming audio from the user. In general, the training procedure incorporates banked speech recordings complemented by real-world sensor data collected from devices worn by users. The system 100 addresses the challenge that pre-surgery speech recordings cannot be captured concurrently with post-surgery sensor data by ensuring that pre-surgery speech data used for training remains similar to acoustic signals available post-surgery when the user wears the device.

Figure 2:
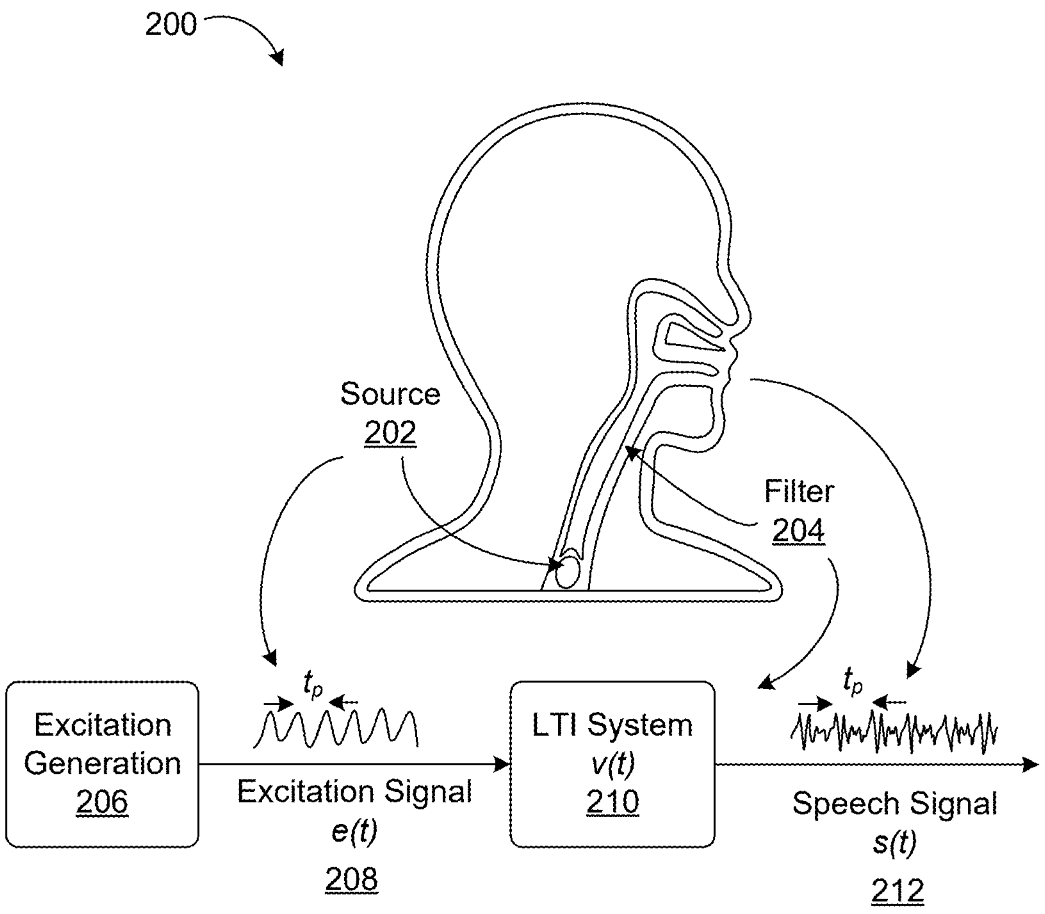
FIG. 2 illustrates speech production diagram which supports techniques for generating personalized speech through adaptive excitation signals.

FIG. 2 illustrates speech production system 200 which supports techniques for generating personalized speech through adaptive excitation signals. The speech production system 200 may include one or more of a source 202, a filter 204, an excitation generator 206, an excitation signal 208, an LTI system 210, and a speech signal 212. The source 202 may represent the opening and closing of vocal folds in the larynx or other articulatory organs, generating initial sound waves for speech production. Example articulatory organs may include the lips, tongue, velum, pharynx, and jaw. Such organs may modify the configuration of the oral cavity during speech. The articulatory organs may adjust positions to create different speech sounds. The articulatory organs may influence the resonance and airflow within the oral cavity. The articulatory organs may interact with the filter 204 to refine the acoustic properties of speech signals. In some embodiments, the articulatory organs may be monitored using motion sensors to detect speech-related movements.

The source 202 may include mechanisms that simulate the vibration of vocal folds to produce sound waves. In some embodiments, the source 202 may generate sound waves that vary in frequency and intensity based on the configuration of the vocal folds. The source 202 may interact with the filter 204 to shape the sound waves into speech signals. In some embodiments, the source 202 may be replaced by the artificial excitation generator 206 to simulate vocal fold vibrations.

The filter 204 may include the vocal tract and nasal cavities, shaping sound waves to produce distinct speech characteristics. The filter 204 may include anatomical structures such as the pharynx, oral cavity, and nasal passages. The filter 204 may modify the sound waves by amplifying or attenuating specific frequencies. The filter 204 may work in conjunction with the source 202 to produce intelligible speech signals. In some embodiments, the filter 204 may be modeled as the LTI system 210 to simulate natural vocal tract behavior.

The excitation generator 206 may represent a system for producing variable excitation signals for speech synthesis. The excitation generator 206 may include components that generate harmonic and noise signals. The excitation generator 206 may produce excitation signals that change dynamically to match natural speech patterns. The excitation generator 206 may interact with the filter 204 to shape the excitation signals into speech signals. In some embodiments, the excitation generator 206 may utilize AI/ML models 105 and/or other algorithms to predict excitation signal parameters.

The excitation signal 208 may include harmonic and noise components that adapt over time to match natural speech patterns. The excitation signal 208 may include periodic pulse trains and random noise elements. The excitation signal 208 may vary in frequency and amplitude to simulate natural vocal fold vibrations. The excitation signal 208 may interact with the filter 204 to produce speech signals with distinct acoustic characteristics. In some embodiments, the excitation signal 208 may be generated based on neural signals detected from a brain-computer interface.

The LTI system 210 may represent a linear time-invariant system that processes excitation signals to simulate natural vocal tract behavior. The LTI system 210 may include mathematical models that represent the acoustic properties of the vocal tract. The LTI system 210 may process excitation signals to produce speech signals with realistic spectral characteristics. The LTI system 210 may interact with the excitation generator 206 to refine the generated excitation signals. In some embodiments, the LTI system 210 may be replaced by a non-linear system to capture more complex vocal tract dynamics.

The speech signal 212 may include acoustic outputs shaped by the oral cavity and excitation signals to approximate natural speech. The speech signal 212 may include sound waves with varying frequencies and amplitudes. The speech signal 212 may be shaped by the filter 204 to produce intelligible speech. The speech signal 212 may interact with the articulatory organs to refine its acoustic properties. In some embodiments, the speech signal 212 may be emitted through one or more intraoral speaker positioned within the oral cavity.

In operation of system 200, the source 202 may generate an excitation signal 208 by producing either pulse waves or noise based on detected speech-related signals. The excitation generator 206 may determine the excitation state sequence by analyzing physiological indicators and neural signals associated with speech initiation. The excitation signal 208 may then pass through the filter 204, which may represent the vocal tract and nasal cavities shaped by articulatory organs, such as the lips, tongue, velum, and jaw.

In some embodiments, the filter 204 may modify the excitation signal 208 by shaping its spectral characteristics to align with previously stored voice characteristics associated with a particular user. The modified signal may be processed through the LTI system 210, which may apply linear transformations to refine the signal's frequency and intensity components. The resulting speech signal 212 may resonate acoustically within the user's vocal tract and nasal cavities, producing intelligible speech output that matches predefined speech characteristics.

Figure 3:
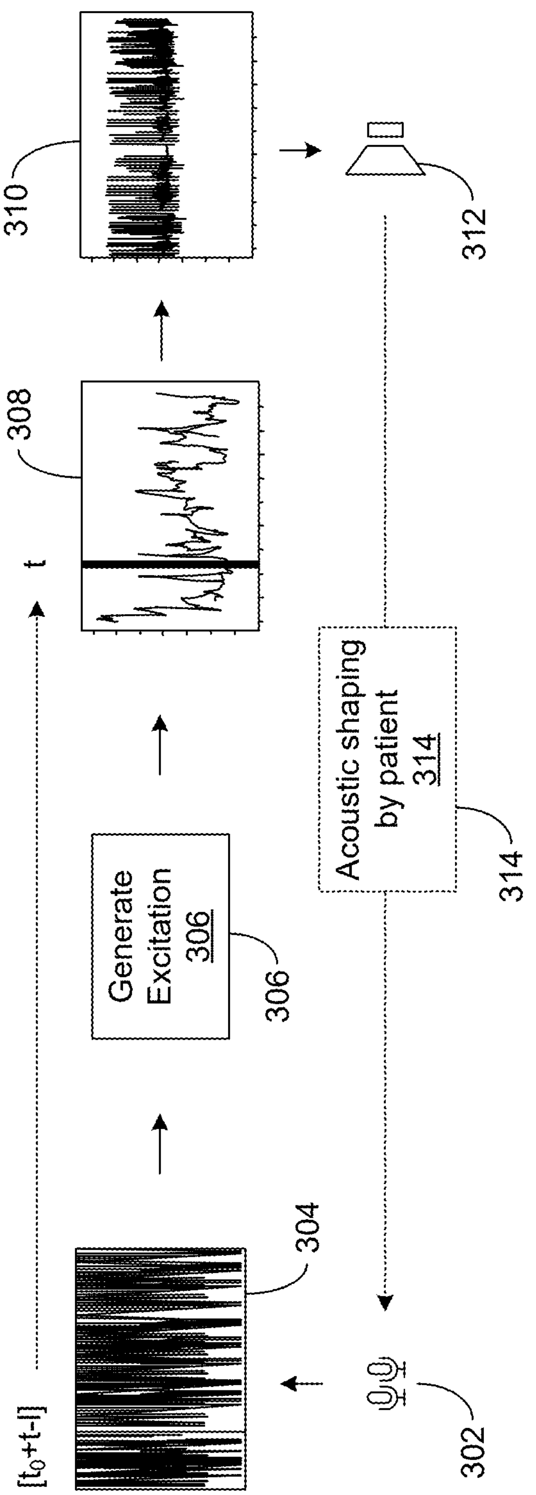
FIG. 3 illustrates an example flow diagram for generating natural audio speech.

FIG. 3 illustrates an example flow diagram 300 for generating natural audio speech. The flow 300 may be carried out by system 100. In this example, the system 100 may include a pair of microphones 302, audio recordings of a user speaking 304, excitation generator 306, an excitation signal 308, a spectrogram/excitation state sequence 310, a speaker 312, and acoustic shaping 314 which is shaped by the oral cavity of a subject.

The pair of microphones 302 may capture acoustic signals from speech attempts performed by a subject. The pair of microphones 302 may include directional or omnidirectional microphones configured to detect sound waves within a specific range of frequencies. The pair of microphones 302 may be positioned substantially adjacent to or near to an oral cavity of the subject to capture speech attempts with high fidelity. The pair of microphones 302 may interact with the sensing system (e.g., sensors 107 and/or physiological sensing component 130) to detect physiological indicators of speech initiation. In some embodiments, alternative configurations may include a single microphone or an array of microphones positioned in different locations around or on the subject.

The flow 300 may include using the audio 304 and/or banked audio for the subject to generate an excitation signal 308 using an excitation generator 306. The excitation signal 308 may represent a variable signal that adapts to match natural intonation patterns associated with speech content. In some embodiments, the excitation signal 308 may be the same as or similar to the excitation signal 208, the excitation generator 206, or a frequency signal, as described elsewhere herein. The excitation signal 308 may be used to generate the spectrogram 310. The spectrogram 310 may visually represent the frequency and energy distribution of the generated speech signals over time.

In some embodiments, the pair of microphones 302 may be positioned to capture acoustic signals emitted during speech attempts, which may include both voiced and unvoiced sounds. These microphones 302 may relay the captured signals to the processor (e.g., processors 106), which may analyze the data to predict excitation signals 308. The excitation signals 308 may represent the temporal and spectral characteristics of speech, including fundamental frequency and harmonic components.

The acoustic shaping 314 may influence the resonance characteristics of the generated speech signals and may include a structure designed to modify the acoustic properties of the speech signals by altering frequency and amplitude characteristics of the signal. The speaker 312 may be positioned within the oral cavity or external to the subject to interact with the generated speech signals. The shaping 314 may work in conjunction with the speaker 312, which may be positioned within the oral cavity of the subject. In some embodiments, the acoustic shaping 314 may be replaced by other acoustic shaping mechanisms, such as filters or resonators. The acoustic shaping 314 may perform adjustments to spectral content of the signal(s) to simulate natural vocal fold vibrations and resonance patterns.

The flow diagram 300 may utilize audio recordings of a user speaking. Such recordings may be used to train ML/AI models that can generate the excitation signal 308 to become the basis for natural-sounding speech to match a voice of the subject. The flow diagram 300 may use input-output examples for training. In text-to-speech synthesis the input-output pairs may be text and the desired speech signal (e.g., a training recording). In voice conversion the input-output examples are represent as recordings of two different people saying the same thing. For system 100, the ML/AI model may be trained using audio recordings of the subject before a surgical modification of the oral cavity to ensure a match to the voice of the subject without alterations to the oral cavity. The ML/AI models used by system 100 and flow diagram 300 represent one or more models that are insensitive to the excitation signal. In general, the goal of system 100 may be to predict an excitation state sequence and use the predicted sequence to generate trained data for generating substantially matched speech patterns and sounds for a specific subject. The system 100 may determine the excitation state sequence from a training speech file. This information can be used as model output during training.

Figure 4:
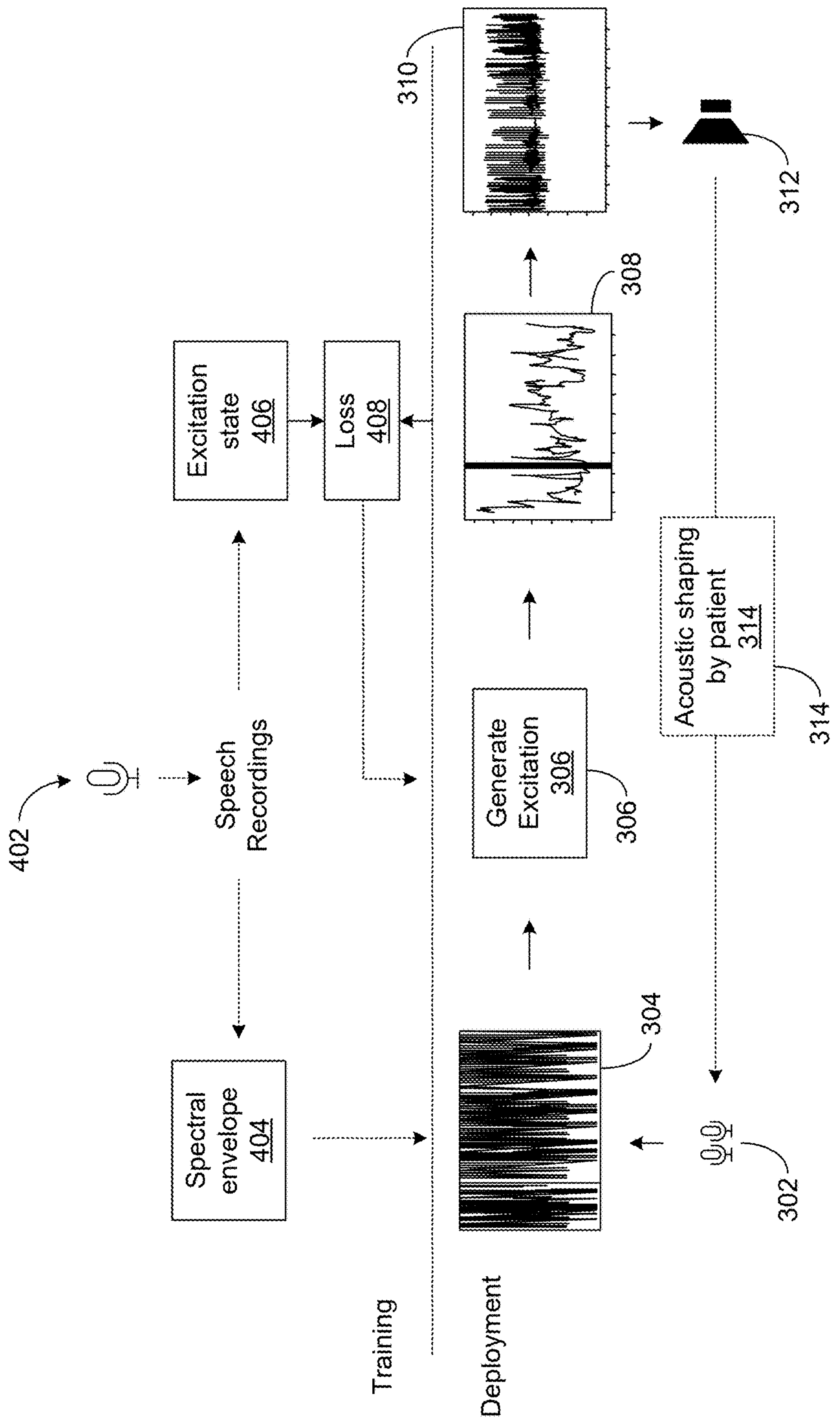
FIG. 4 illustrates example speech analysis flow diagram which supports techniques for generating personalized speech through adaptive excitation signals.

FIG. 4 illustrates example speech analysis flow diagram 400 which supports techniques for generating personalized speech through adaptive excitation signals. The speech analysis architecture 400 depicts a training phase and a deployment phase. During training, the system 100 may execute flow diagram 400 and use speech recordings to create two representations of a signal. The first representation includes spectral envelope 404, which ignores the excitation signal. The second representation includes the excitation state 406 with a loss 408. The second representation represents extracted excitation signal information. The first representation that removes (or ignores) the excitation information is expected to be similar to what can be observed post-surgery for a subject when the device executing system 100 is deployed. This representation 404 may be used as input to the model for training. The excitation state sequence representation is used as the model target (desired output) during training. The result is a model that generates excitation state sequences in response to incoming audio 302 of the user speaking.

The spectral envelope 404 may represent frequency-dependent characteristics of the vocal tract during speech production. The spectral envelope 404 may be determined by analyzing the peaks and valleys in the frequency spectrum of speech signals. The spectral envelope 404 may be used to shape excitation signals to match the vocal tract configuration of a subject. In some embodiments, the spectral envelope 404 may correspond to the filter 204, which may modify the excitation signal to produce speech content. Alternatives to the spectral envelope 404 may include other representations of vocal tract characteristics, such as formant frequencies.

The excitation state 406 may provide information about whether speech is inactive, unvoiced, or voiced at a given time. The excitation state 406 may be encoded as discrete values representing different states of speech activity. The excitation state 406 may interact with the excitation signal 406 to determine the type of signal generated during speech synthesis.

The excitation state sequence 310 may represent a temporal progression of excitation states for speech synthesis. The excitation state sequence 310 may be determined by analyzing speech signals over time to identify transitions between inactive, unvoiced, and voiced states. The excitation state sequence 310 may be used to generate excitation signals that mimic natural speech patterns. The loss 408 may quantify discrepancies between predicted and actual excitation states during model training.

Figure 5:
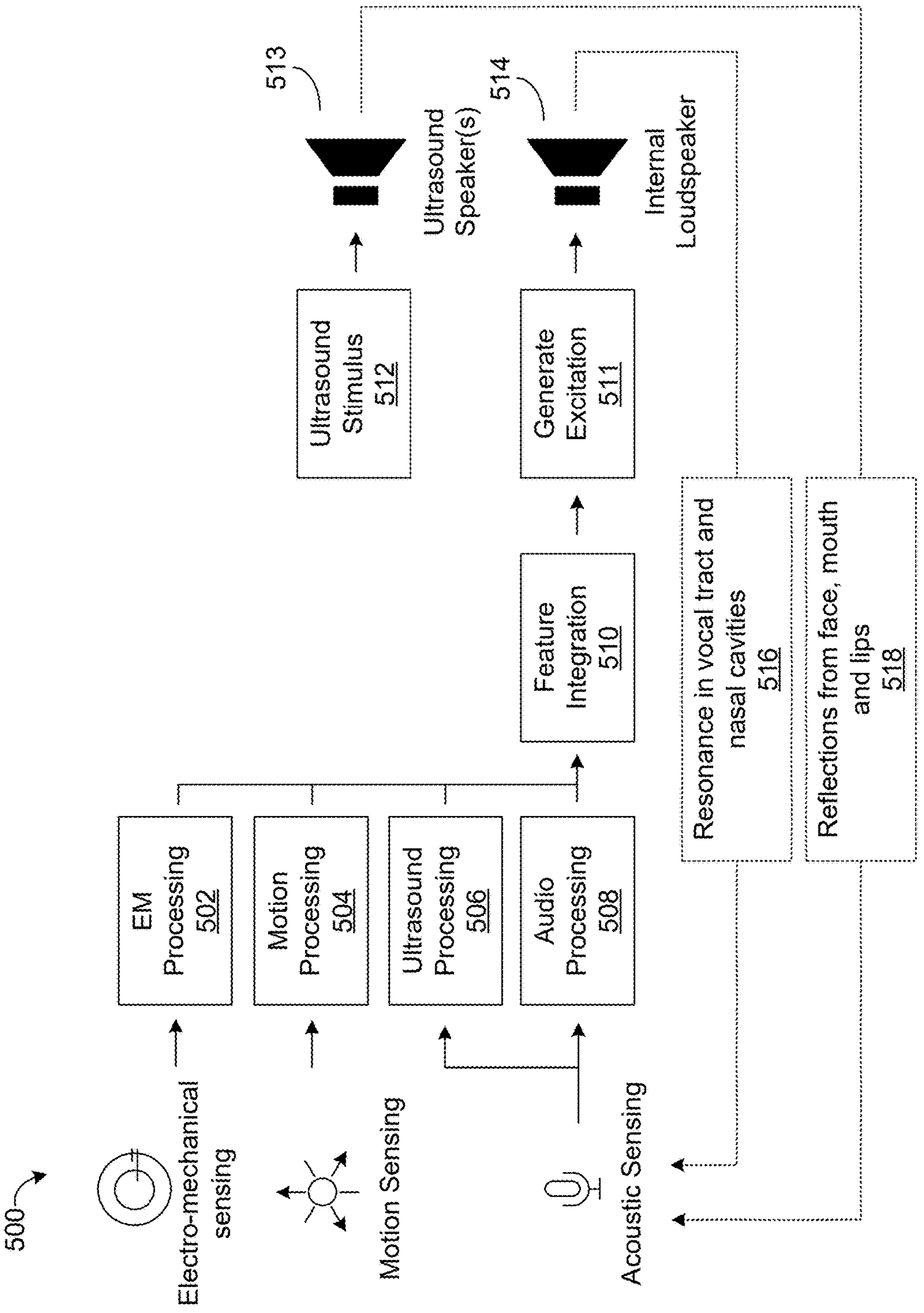
FIG. 5 illustrates a multi-sensor architecture for generating personalized speech through adaptive excitation signals.

FIG. 5 illustrates a multi-sensor architecture 500 for generating personalized speech through adaptive excitation signals. The multi-sensor architecture 500 may include one or more of an electromechanical sensing unit 502, a motion sensing unit 504, an ultrasound processing unit 506, an audio processing unit 508, a feature integration unit 510, an excitation generator 511, an ultrasound stimulus 512, an ultrasound speaker 513, an intraoral speaker 514, a resonance in vocal tract and nasal cavities 516, and a reflections from face, mouth and lips 518.

The electromechanical sensing unit 502 may include mechanisms to detect physical interactions or changes related to speech production. The electromechanical sensing unit 502 may include sensors capable of detecting variations in pressure, force, or displacement associated with speech articulation. The unit 502 may interact with anatomical structures such as the jaw or tongue to detect mechanical changes during speech attempts. In some embodiments, the electromechanical sensing unit 502 may work in conjunction with the motion sensing unit 504 to enhance the detection of speech-related movements. Alternatives to the electromechanical sensing unit 502 may include piezoelectric sensors, strain gauges, EEG sensors, or the like.

The motion sensing unit 504 may represent a system capable of detecting movements associated with anatomical structures involved in speech articulation. The motion sensing unit 504 may include accelerometers or gyroscopes to detect dynamic changes in position or orientation of the jaw, lips, neck, or tongue. The unit may capture data related to the velocity and direction of movements during speech attempts. In some embodiments, the motion sensing unit 504 may integrate data with the ultrasound processing unit 506 to refine the analysis of oral cavity configurations. Examples of motion sensing unit 504 may include wearable devices or embedded sensors in intraoral systems.

The ultrasound processing unit 506 may provide functionality to analyze acoustic reflections for detecting configurations of the oral cavity and/or pharynx. The ultrasound processing unit 506 may include transducers capable of emitting and receiving high-frequency sound waves to map the spatial arrangement of oral cavity structures. The unit 506 may detect changes in the position of the tongue, lips, neck, or velum during speech attempts. In some embodiments, the ultrasound processing unit 506 may collaborate with the audio processing unit 508 to correlate acoustic reflections with sound signals. Alternatives to the ultrasound processing unit 506 may include optical imaging systems or magnetic resonance imaging.

The audio processing unit 508 may include components to capture and process sound signals related to speech attempts. The audio processing unit 508 may include microphones positioned to detect acoustic signals emanating from the oral cavity during speech production. The unit 508 may process these signals to extract features such as pitch, intensity, and spectral content. In some embodiments, the audio processing unit 508 may integrate data with the feature integration unit 510 to create unified input vectors for speech generation models. Examples of audio processing unit 508 may include directional microphones or multi-channel audio systems.

The feature integration unit 510 may represent a module that combines data from multiple sensing systems into a unified input for speech generation models. The feature integration unit 510 may include algorithms to merge data from the electromechanical sensing unit 502, motion sensing unit 504, ultrasound processing unit 506, and audio processing unit 508. The unit 510 may process these inputs to create feature vectors that represent speech-related signals comprehensively. In some embodiments, the feature integration unit 510 may interact with the excitation generator 511 to refine excitation state sequences. Alternatives to the feature integration unit 510 may include machine learning-based fusion systems or statistical data integration methods.

The ultrasound stimulus 512 may include an acoustic signal directed toward the oral cavity to detect structural changes during speech attempts. The ultrasound stimulus 512 may include high-frequency sound waves emitted by transducers to interact with anatomical structures such as the tongue, lips, neck, or velum. The stimulus may generate reflections that are analyzed by the ultrasound processing unit 506. In some embodiment, the ultrasound stimulus 512 may be synchronized with the motion sensing unit 504 to enhance the detection of dynamic changes. Examples of ultrasound stimulus 512 may include focused ultrasound beams or wide-field acoustic signals. Speakers 513 may be incorporated with ultrasound stimulus 512 to output speech.

The intraoral speaker 514 may represent a device positioned within the oral cavity to emit synthesized speech signals. The intraoral speaker 514 may include miniature transducers capable of producing sound waves shaped according to excitation signals. The speaker 514 may be positioned to interact acoustically with the oral cavity and nasal cavities to produce intelligible speech. In some embodiments, the intraoral speaker 514 may work in conjunction with the resonance in vocal tract and nasal cavities 516 to refine speech output. Alternatives to the intraoral speaker 514 may include bone-conduction speakers or external speakers and/or ultrasound speakers 513. In some embodiments, the speaker 514 may be replaced by or integrated with a straw conduit that may deliver audio output generated by system 100 and/or system 500 into (or substantially near to) the oral cavity of a subject.

The resonance in vocal tract and nasal cavities 516 may include acoustic phenomena resulting from interactions between excitation signals and anatomical structures. The resonance in vocal tract and nasal cavities 516 may involve the amplification and filtering of sound waves as they pass through the oral cavity, pharynx, and nasal passages. The phenomena may be influenced by the shape and configuration of articulatory organs such as the tongue, lips, and velum. In some embodiments, the resonance in vocal tract and nasal cavities 516 may be analyzed alongside reflections from face, mouth, and lips 518 to refine speech synthesis models. Examples of resonance in vocal tract and nasal cavities 516 may include harmonic amplification or damping effects.

The reflections from face, mouth, and lips 518 may represent acoustic feedback captured during speech attempts to determine articulatory configurations. The reflections from face, mouth, and lips 518 may include sound waves that bounce off external anatomical structures during speech production. The feedback may be analyzed to detect movements or positions of the lips, jaw, or cheeks. In some embodiments, the reflections from face, mouth, and lips 518 may complement data from the ultrasound processing unit 506 to enhance oral cavity mapping. Alternatives to reflections from face, mouth, and lips 518 may include optical feedback systems or electromagnetic sensing methods.

In some embodiments, the electromechanical sensing unit 502 may detect physiological signals associated with speech initiation, such as muscle movements or vibrations, and transmit these signals to the feature integration unit 510 for processing. The motion sensing unit 504 may capture data related to the movement of anatomical structures, such as the jaw or lips, and relay this information to the feature integration unit 510 to complement the physiological signals. The ultrasound processing unit 506 may analyze acoustic reflections generated by the ultrasound stimulus 512, which may interact with the user's oral cavity to detect changes in the configuration of the mouth, tongue, and other anatomical features.

In some embodiments, the audio processing unit 508 may process acoustic signals captured by a microphone to extract features indicative of speech-related activity. These features may be combined with data from the electromechanical sensing unit 502, motion sensing unit 504, and ultrasound processing unit 506 within the feature integration unit 510 to generate a unified input vector. The feature integration unit 510 may transmit this input vector to the processor, which may determine excitation signals based on the user's oral cavity configuration and speech-related signals. The intraoral speaker 514 may emit speech represented by the generated excitation signals, which may resonate within the vocal tract and nasal cavities 516 to produce intelligible speech output. Reflections from the face, mouth, and lips 518 may interact with the emitted signals to shape the acoustic characteristics of the speech output.

In the system 500, banked speech recordings may be used for training the excitation generation model, but these can be complemented by real-world sensor data collected from devices worn on subjects.

Figure 6:
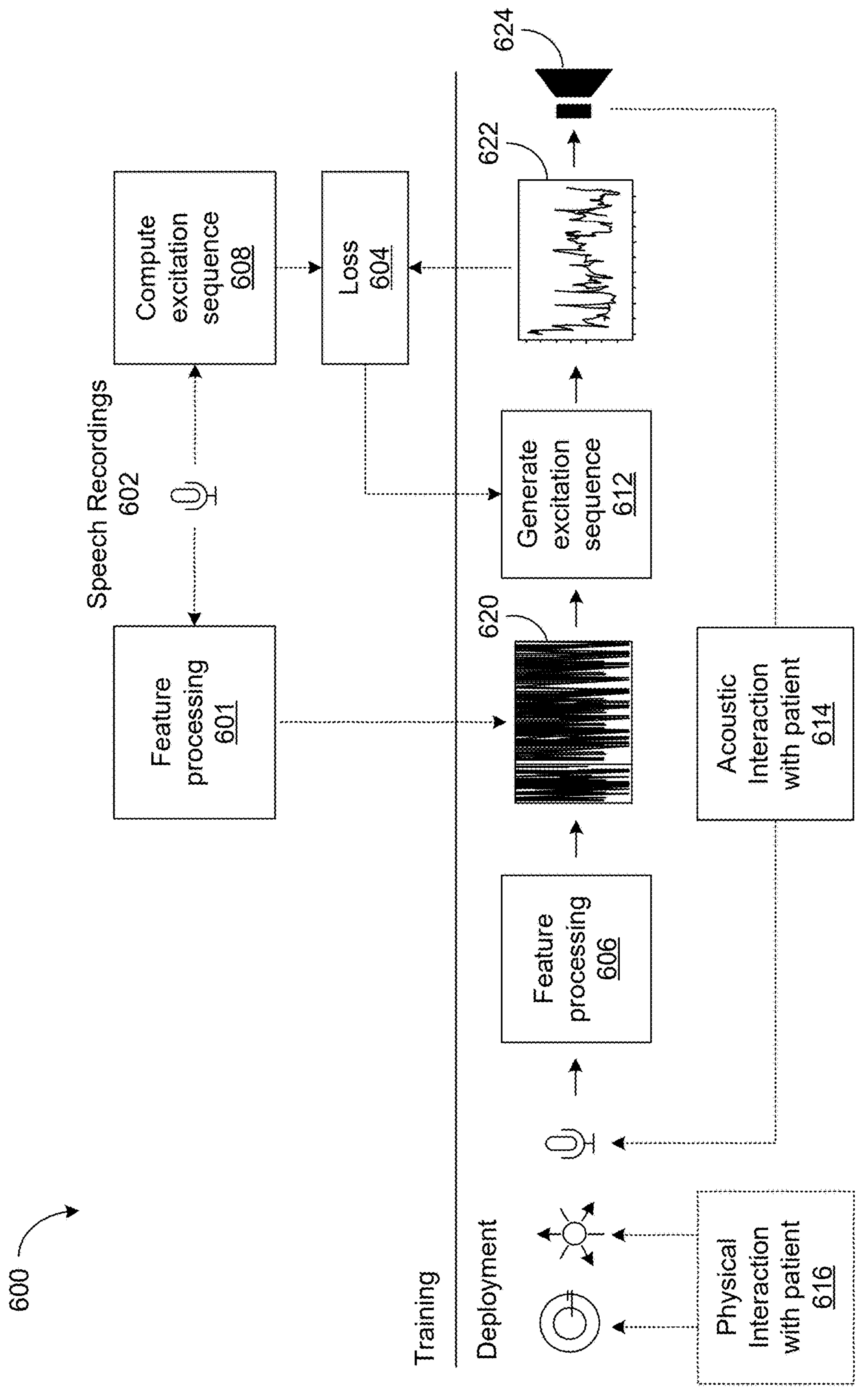
FIG. 6 illustrates a training and deployment diagram for generating personalized speech through adaptive excitation signals.

FIG. 6 illustrates a training and deployment diagram 600 for generating personalized speech through adaptive excitation signals. At a high level, the training procedure may be similar to the audio-only output of system 500, but with simplified sensor processing and integration stages into one feature processing block 601. Operations involved in diagram 600 may include feature processing 601, speech recordings 602, a compute excitation sequence block 608, a loss function 610, a generate excitation sequence 612, an acoustic interaction with patient 614, and/or physical interaction with patient 616, which may be examples of corresponding devices described herein. The training deployment may describe a process for integrating multimodal sensor data and audio recordings to train and deploy a model for generating excitation sequences tailored to individual users.

In a deployment phase, a feature processing block 606 may include transforming multimodal sensor data into input vectors suitable for excitation sequence generation. In some embodiments, the feature processing block 606 may extract time-domain and frequency-domain characteristics from multimodal sensor data. The feature processing block 606 may combine data from microphones, motion sensors, and ultrasound devices to create a unified input vector. The feature processing block 606 may determine auditory spectrograms 620 and pitch tracking information from audio signals captured by microphones. The feature processing block 606 may transform high-rate sensor data into lower-rate feature vectors suitable for real-time processing. In some embodiments, pitch tracking may refer to tracking a fundamental frequency of a particular signal. The processed features may be pre-processed to normalize and/or tokenize features to enhance the compatibility of the input features with particular speech characteristics or outputs associated with the subject. The feature vectors may be used to generate excitation sequences 612, which may be used to generate audio output at speaker 624. For example, excitation sequences may be determined based on the processed input features. For example, processed input features may be analyzed to identify excitation states, such as inactive, unvoiced, or voiced. Pitch values 622 may be determined for voiced states by referencing training data corresponding to previously stored speech associated with a particular user.

The speech recordings 602 may include pre-surgery audio data and other voice samples for training the excitation sequence generation model. In some embodiments, the speech recordings 602 may include audio files captured from the subject prior to a medical procedure. The speech recordings 602 may include voice samples from other individuals to expand the training dataset. The speech recordings 602 may determine linguistic features and excitation state sequences for model training. The speech recordings 602 may include annotated datasets with phoneme probabilities and pitch sequences.

The compute excitation sequence block 608 may include determining excitation state sequences based on input vectors and model parameters. In some embodiments, the compute excitation sequence block 608 may determine whether the excitation state is inactive, unvoiced, or voiced for each time frame. The compute excitation sequence block 608 may determine pitch values for voiced excitation states using trained neural network models. The compute excitation sequence block 608 may determine harmonic components and spectral characteristics for voiced excitation states. The compute excitation sequence block 608 may determine excitation state transitions based on probabilities derived from training data.

The loss 610 may represent differences between predicted excitation sequences and training data during model evaluation. In some embodiments, the loss 610 may determine discrepancies between predicted pitch values and actual pitch values in the training dataset. The loss 610 may determine differences in excitation state probabilities for inactive, unvoiced, and voiced states. The loss 610 may determine errors in predicted excitation state transitions compared to observed transitions in the training data. The loss 610 may determine statistical measures of prediction accuracy for excitation state sequences.

The generate excitation sequence 612 may include producing excitation signals tailored to individual users based on trained model outputs. In some embodiments, the generate excitation sequence 612 may produce pulse trains for voiced excitation states with specific inter-pulse intervals. The generate excitation sequence 612 may produce noise signals for unvoiced excitation states based on frequency characteristics. The generate excitation sequence 612 may produce blended signals combining harmonic and noise components for natural-sounding speech. The generate excitation sequence 612 may produce excitation signals that match the user's pitch range and speaking style.

The acoustic interaction with patient 614 may emit synthesized speech signals through intraoral speakers positioned within the oral cavity. In some embodiments, the acoustic interaction with patient 614 may emit speech signals shaped by the user's oral cavity configuration. The acoustic interaction with patient 614 may emit speech signals with natural intonation patterns determined by the excitation sequence. The acoustic interaction with patient 614 may emit speech signals that resonate within the vocal tract and nasal cavities. The acoustic interaction with patient 614 may emit speech signals that approximate the user's pre-surgery voice characteristics.

The physical interaction with patient 616 may include detecting anatomical movements and physiological indicators to refine excitation signal generation. In some embodiments, the physical interaction with patient 616 may detect jaw movements using motion sensors positioned on the subject. The physical interaction with patient 616 may detect tongue and lip movements using ultrasound devices. The physical interaction with patient 616 may detect muscle activity in the neck region using electromechanical sensors. The physical interaction with patient 616 may detect physiological signals associated with speech initiation to adjust excitation state predictions.

Example models for generating excitation state sequences may be used and/or otherwise modified by algorithm processing component 110. Such example models may include statistical models, neural network models (e.g., any combination of convolutional, recurrent and transformer layers), or the like. In some embodiments, system 100 may predict (e.g., generate) excitation sequence for a particular subject. The sequence may include one or more combination of a discrete value (inactive, unvoiced, voice) and a continuous value (i.e., the real-valued f0 during voiced frames). In some embodiments, the system 100 may encode the discrete and continuous value(s) into a single vector with enough dimensions to represent the desired pitch resolution and range. For example, dimension 0 can be set to 1 when the excitation state is inactive, and dimension 1 can be set to 1 when the excitation state is unvoiced, and another 91 dimensions could be used for fundamental frequencies from 50 to 500 Hz with 5-Hz resolution, where a dimension is set to 1 when the pitch is closest to the "bin" (50 Hz, 55 Hz, 60 Hz . . . 495 Hz, 500 Hz). This example may use a 64-dimensional vector. In some embodiments, the system 100 may instead build two models. A first model may be used to predict basic excitation states (e.g., inactive, unvoiced, voiced), and a second model may be used to predict the pitch sequence when the excitation state is voiced.

In operation of the two model example, the system 100 may use the first model to predict the basic excitation state, and the second model may be used to generate a pitch when the state is estimated to be voiced. For numerical reasons, it can be useful to take a base-2 logarithm of the fundamental frequencies. This also corresponds with music traditions that treat octave doublings as equivalently-spaced steps (e.g., A "distance" from C4 to C5 is the same as C5 to C6). The system 100 may also constrain the fundamental frequency to be about 50 Hz or greater, and subtract the log of this minimum to ensure target output values approach 0.

In some embodiments, the system 100 may implement a Gaussian/bell curve model. For example, for the prediction of the log-normalized pitch values, the system 100 may calculate a mean and standard deviation from the pitches in the training recordings, which functions to personalize the excitation prediction to the subject. Such calculations may capture an individual's physical size (e.g., as related to average pitch) and speaking style (e.g., a range of pitches). To use such a model in practice, the system 100 may incorporate a random number generator to obtain (pseudo) random samples from the pitch distribution. The average pitch generated will be consistent with an average pitch of the subject. However, Gaussian-only models may not generate natural-sounding pitch sequences with smoothly-changing trajectories over time.

In some embodiments, the system 100 may implement a polynomial model to model pitch sequences using polynomial functions. For example, system 100 may extract pitch sequences and then compute statistics on the full set of sequences where each sequence is a connected segment of voiced speech. In addition to statistics about the pitch and sequence length, the system 100 may fit polynomials with different orders to length-normalized sequences. In some examples, the system 100 may utilize cubic polynomials to model the real-world sequences. The system 100 may compute means and standard deviations of the cubic parameters and again use a random number generator to select among these shapes. In some embodiments, the system 100 may utilize a mixture of Gaussian models to find prominent clusters in the cubic parameters and then use a hidden Markov model to capture the temporal evolution.

In some embodiments, the system 100 may implement neural network sequence to sequence models to make predictions of excitation states from input data. An example sequence model may be denoted by synchronously-sampled time-series data collected from a set of sensors as shown in term [2]:

$$s_m(n) \qquad [2]$$

where m∈[1, . . . . M] n∈[1, . . . . N] with indexing the sensor and indexing across discrete-time samples.

There are many techniques available for system 100 to pre-process the raw time series data. For example, system 100 may assume a stage that operates at a lower rate (e.g. 200 Hz) than the sampling process (e.g. 48 kHz), that serves to transform the sensor data into an input vector (e.g., a feature vector), as shown by vector [3] and equation [4]:

$$xt \in \mathbb{R}\, n \qquad [3]$$

$$x_t = f_{(fe)}(s(t-1)L{:}tL);\theta_{(fe)}) \qquad [4]$$

where t∈[1, . . . . T] L indexes the lower-rate process, and is the number of high-rate samples per time frame. Here f (fe) denotes an arbitrary linear or non-linear front end (or feature θ(fe) extraction) process with (possibly learned) parameters. A sequence-to-sequence model can be formulated as shown in equation [5]:

$$y1{:}T = f(nn)(x1{:}T;\theta(nn)) \qquad [5]$$

where yt∈Rm t f (nn) is an output vector for step produced by a model, in response to the sequence of input vectors. The notation 1:T 1 is used to indicate sequence from time step T θ(nn), and is the set of model parameters, which are estimated using training examples.

Figure 7:
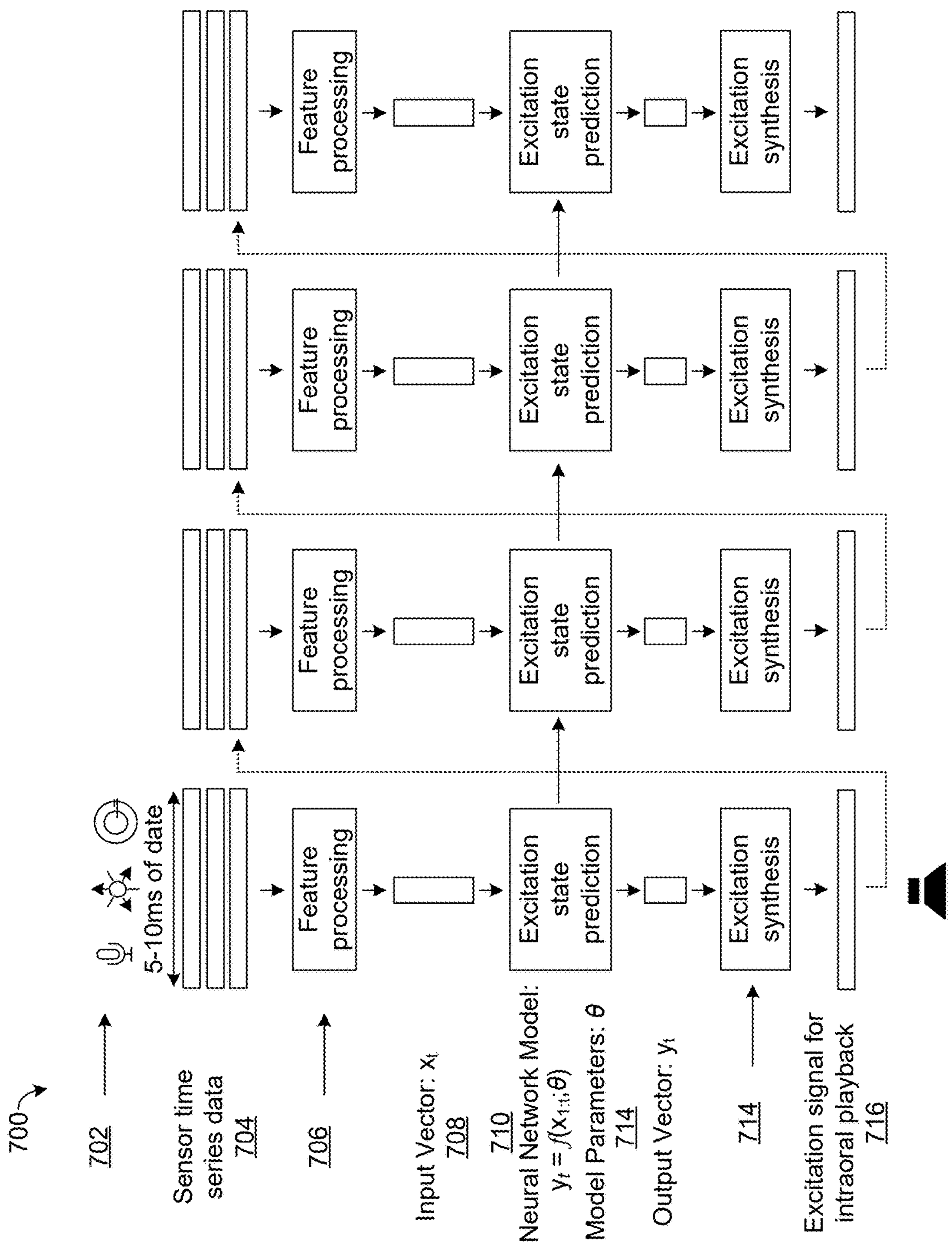
FIG. 7 illustrates a data flow for generating a personalized excitation signal for a subject to generate intraoral playback.

FIG. 7 illustrates a data flow 700 for generating a personalized excitation signal for a subject to generate intraoral playback. The data flow 700 depicts data flow from sensor acquisition through feature processing to produce an input vector. The data flow 700 may be performed according to one or more algorithm in algorithm processing component 110. The input vector may be represented as $x_t$, which flows through one or more models described herein to predict the excitation state, $y_t$. A run-time algorithm may perform flow 700 and may operate on segments of sensor time-series data of about 5 ms to about 50 ms. The information in such segments may be encoded in the input vector for each particular time step. Any new data may be passed to the neural network model, which has internal state memory to keep track of older input vectors and also the output of intermediate model layers. The arrows showing data moving to the right through the excitation state precision model may capture this internal memory of the model.

In this example, the model includes a series of layers, where each layer transforms input to output with predefined operations that incorporate a set of free parameters (e.g., weights or coefficients). The per layer transformation may be denoted as:

$$x_{1:T}^{(d)} = f^{(d)}\left(x_{1:T}^{(d-1)};\theta^{(d)}\right) \qquad [6]$$

where $\theta^d$ is the set of parameters for layer d, where $$x_{1:T}^{(0)}$$

represents network input, where $$x_{1:T}^{(D)}$$

represents network output.

Network layers may be linear (e.g., fully connected), convolutional, recurrent, pooling, normalization, and non-linear. Alternatives, such as attention layers, transformer layers, and many others are possible. Within these larger categories there are sub-types that may be used including, but not limited to long short-term memory recurrent (LSTM) layers and gated recurrent unit layers, batch normalization, instance normalization, etc. While the terms recurrent layer and normalization layer may be used in this description, any respective recurrent technique may replace the recurrent technique described and any respective normalization technique may replace the normalization techniques described.

A horizontal axis in the data flow 700 may represent the frame index or time progression, with units potentially corresponding to sequential audio frames or temporal intervals. A vertical axis in the data flow 700 may represent the excitation state or pitch frequency, depending on the specific sub-graph being described. For excitation states, the vertical axis may include discrete categories such as inactive, unvoiced, and voiced. For pitch frequencies, the vertical axis may represent the fundamental frequency in Hertz (Hz) or a logarithmic transformation of the frequency values.

The data points in the data flow 700 may be represented as individual markers or lines, depending on the specific sub-graph. For excitation states, the data points may be discrete markers indicating transitions between inactive, unvoiced, and voiced states. For pitch frequencies, the data points may form a continuous curve, illustrating the variation of pitch values over time. The flow 700 may exhibit trends such as clusters of voiced frames with corresponding pitch frequencies, as well as intervals of unvoiced or inactive states.

The flow 700 may include features such as peaks and valleys in the pitch frequency curve, which may correspond to variations in the fundamental frequency during voiced excitation states. These features may provide insight into the dynamic range and resolution of the pitch encoding process. Additionally, the flow 700 may highlight the use of logarithmic scaling for pitch frequencies, which may align with musical scaling/pitch and facilitate the representation of octave doublings as equivalently spaced steps.

The data flow 700 may include multiple sub-graphs, each focusing on a specific aspect of the excitation sequence representation. For example, one sub-graph may illustrate the discrete excitation states over time, while another may depict the corresponding pitch frequency curve. The relationship between these sub-graphs may demonstrate how the excitation state influences the generation of pitch values, thereby providing a comprehensive view of the statistical modeling approach.

At line 702, any number of sensors may be used to detect or determine movement, acoustic signals, or other speech related signal corresponding to an oral cavity of a subject. Detections and/or sensor sampling may be performed synchronously or asynchronously from one another. Detection and/or determinations may be attempted to capture signal every about 5 ms up to every about 50 ms. For example, detection or determinations may be performed by system 100 at about 5 ms to about 10 ms; about 10 ms to about 15 ms; about 15 ms to about 20 ms; about 20 ms to about 25 ms; about 25 ms to about 30 ms; about 30 ms to about 35 ms; about 35 ms to about 40 ms; about 40 ms to about 45 ms; or about 45 ms to about 50 ms.

At line 704, the system 100 may generate time series sensor data from the detected sensor data. At line 706, the system 100 may perform feature processing on the sensor time series data. Such data may be used to generate input vector(s), at line 708. In some embodiments, the feature processing may include AI/ML processing, as described elsewhere herein.

At line 710, the system 100 may process the detected signals through at least one artificial intelligence algorithm trained on banked speech corresponding to the subject. For example, the input vector(s) may be used in a neural network model using model parameters 712 to generate an excitation state prediction. The prediction may pertain to predicting upcoming excitation signals based on the processed signals. The predicting may include processing the signals in temporal segments and determining excitation signal parameters for subsequent temporal segments. At step 714, the system 100 may include generating, based on the predicting, new excitation signals acoustically shaped according to one or more characteristics in the banked speech corresponding to the subject. At line 716, the system 100 may cause production of speech according to the new excitation signals. Such produced speech is generated to substantially match patterns and intonation in the banked speech.

Figure 8:
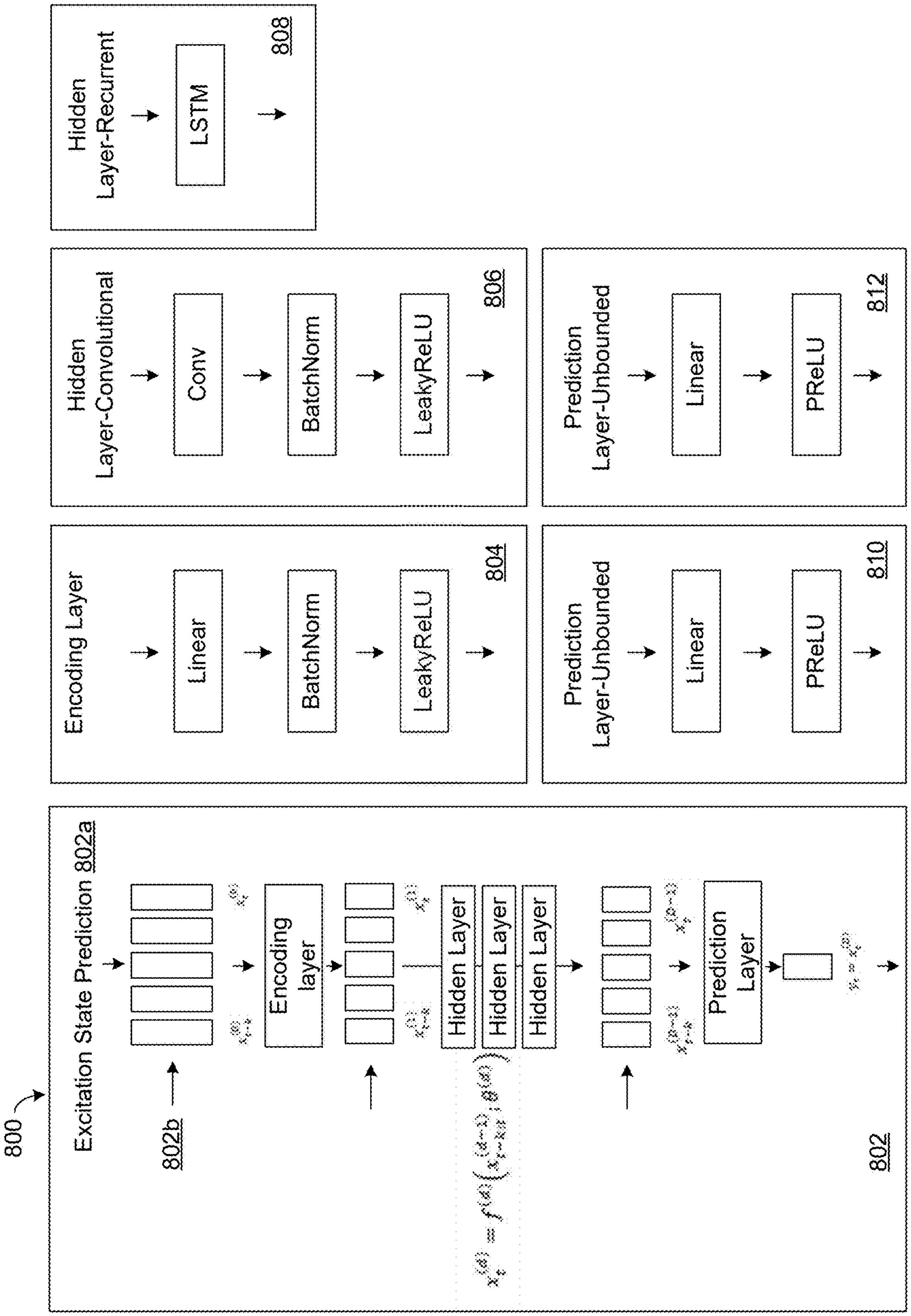
FIG. 8 illustrates an example neural network architecture for excitation state prediction.

FIG. 8 illustrates an example neural network architecture for excitation state prediction. Each layer in this example may be assumed to be a function of input and may have a set of associated parameters. The excitation state prediction block 802 may represent the excitation state prediction model, where a new input vector enters at the top 802*a* and is combined with prior input vectors stored by the model (as shown at 802*b*). An encoding layer 804 transforms the dimensionality of the input vector prior to passing through a series of hidden layers 806, 808, etc., each of which computes a separate transformation of the data. Finally one or more prediction layers 810, 812 transforms the final hidden layer's data (i.e., performs data embedding) into the new output prediction.

In some embodiments, the system 100 may implement a Bayesian framework rather than an AI/ML model framework. A Bayesian approach can integrate multiple models into one prediction framework. For example, the system 100 may use a Bayesian approach to estimate a probable sequence of excitation states (e.g., Vt∈{0=inactive, 1=unvoiced, 2=voiced}) given all of the prior observation data (e.g., x1:t−1). The system 100 may also estimate an expected value of the excitation pitch (e.g., Ft∈ $\mathbb{R}$), at each time frame, given the observation data and state sequence. These two problems may be represented in equations [7] and [8]:

$$P(V1{:}t|x1{:}t-1) \qquad [7]$$

$$E[F1{:}t|V1{:}t,x1{:}t-1] \qquad [8]$$

Using Bayes Theorem, the Markov property and other statistical assumptions a first probability may be represented as equation [9]:

$$P\left(V_{1:T}\middle|x_{1:T-1}\right) \propto P\left(V_{1}\right)\prod\nolimits_{t=2}^{T} P(V_t|V_{t-1})P\left(V_t\middle|x_{1:t-1}\right) \qquad [9]$$

One example property of this equation is that it can be executed recursively using equation [10]:

$$P(V1{:}t|x1{:}t-1) \propto P(V_t|V_t-1)P(V_t|x1{:}t-1)P(V1{:}t-1|x1{:}t-2) \qquad [10]$$

given a prior time's computation of P (V1:t−1|x1:t−2), multiply by the transition probability and the new neural network output may be: P (Vt|Vt−1) P (Vt|x1:t−1).

Excitation state data may be used across the training set to calculate the number of times each state occurs, and the number of transitions from each state to the other states. From these, system 100 can compute the frequency of each and treat these as the probabilities P (Vt|Vt−1) and P (Vt). A second neural network may be used to model E [F1:t|V1:t, x1:t−1] directly. In training, system 100 may have access to the true excitation state sequence V1:t, however at inference time this is typically unknown, so instead the system 100 may use P (V1:t|x1:t−1). A low-pass filter may be used on the output of the neural network model to avoid an inaccurate sound due to the network prediction being somewhat noisy. Just as in the above breakdown, this could be interpreted probabilistically as a term such as P $(F_t|F_{t-1})$.

Example algorithm steps may include, but are not limited to (i) collect a block of new sensor data such as $s_t=\{s_0((t-1)L{:}tL), \ldots, s_{M-1}(t-1)L{:}tL)\}$ (ii) compute $x_t=f^{(fe)}(s_t;\theta^{(fe)}$, (iii) compute P $(V_t|x_{1:t-1}) \propto f^{(state\text{-}nn)}(x1{:}t-1; \theta^{(state\text{-}nn)}$, (iv) update $\tilde{}V_{1:t}=P(V_{1:t}|x_{1:t-1}) \propto P(V_t|V_{t-1})\ P(V_t|x_{1:t-1})\ P(V_{1:t-1}|x_{1:t-2})$, (v) update $\tilde{}F_{1:t}=E[F_{1:t}|V_{1:t}, x_{1:t-1}] \approx f^{(pitch\text{-}nn)}(\tilde{}V_{1:t}, x_{1:t-1}; \theta^{(pitch\text{-}nn)})$, and (vi) synthesize the next block of excitation signal $\tilde{}e_t=f$ (synthesizer) $(\tilde{}F_t, \tilde{}V_t)$.

Given the algorithm steps above, the system 100 may utilized the following models for training: $f^{(state\text{-}nn)}(x1{:}t-1; \theta^{(state\text{-}nn)}$, $f^{(pitch\text{-}nn)}$, ˜V1:t, x1:t−1; $\theta^{(pitch\text{-}nn)}$, P $(V_t|V_{t-1})$ P $(V_t)$.

In general, P $(V_t)$ and P $(V_t|V_{t-1})$ may be computed using the state and state transition frequencies in the training set. These statistics may not be dependent on each individual person, so system 100 may compute the statistics over the entire set of any number of voices. In some embodiments, the system 100 may perform supervised learning of neural network parameters like $\theta^{(state\text{-}nn)}$ and $\theta^{(pitch\text{-}nn)}x_{1:T}$.

In some embodiments, the system 100 may utilize a pitch model that uses generative adversarial networks (GANs). For example, one network and a generator may be responsible for creating fake sequences of data. Another network, the discriminator, may determine whether a sequence is real or fake. So for each set of training examples, the system 100 may use the generator to try to create a fake sequence and the discriminator may be used to decide if both are real or fake.

Methods

Figure 9:
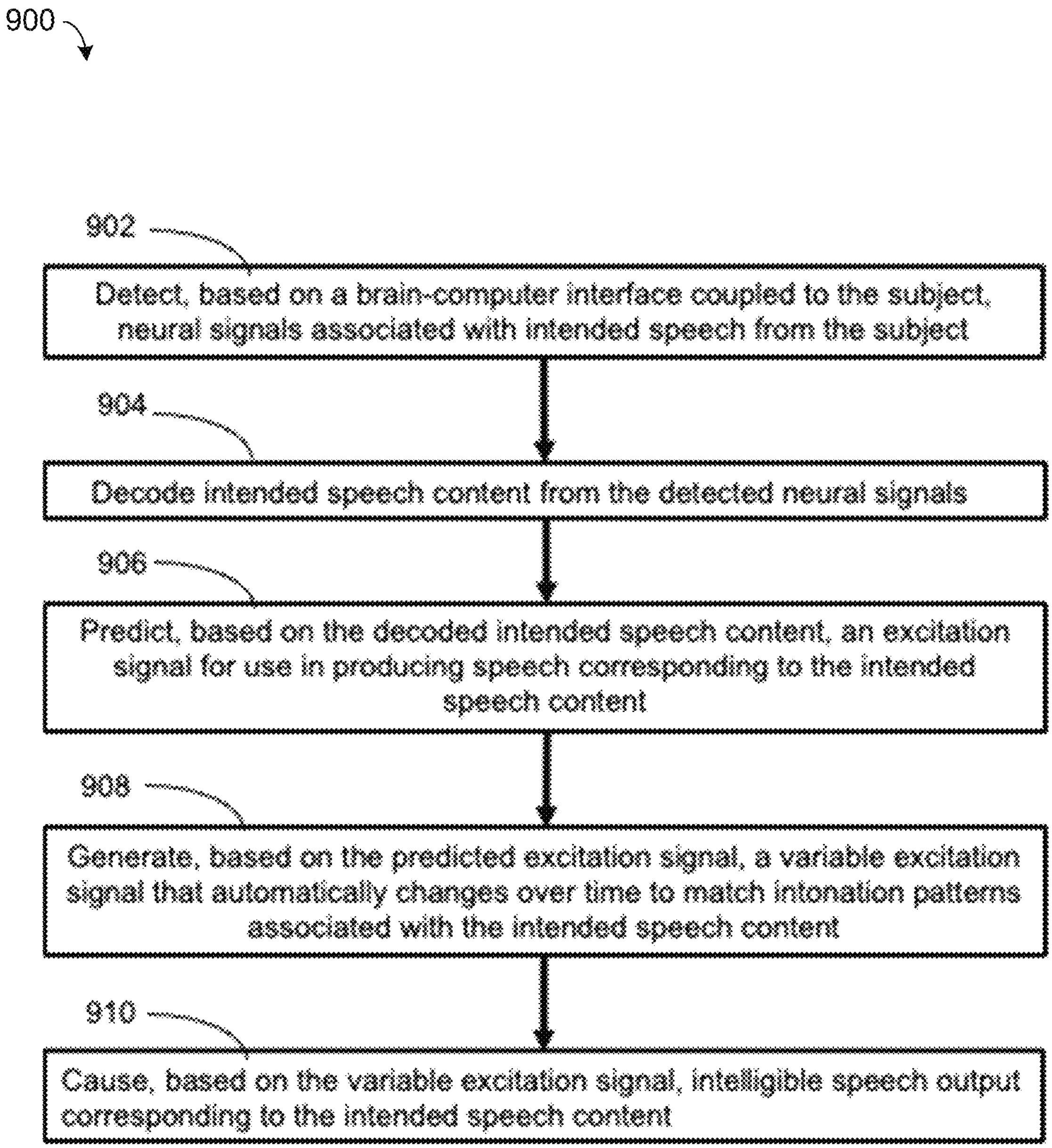
FIG. 9 illustrates a flow diagram of an example process for generating a personalized excitation signal for a subject.

FIG. 9 illustrates a flow diagram of an example process 900 for generating a personalized excitation signal for a subject. The process 900 may be performed using real-time intonation and voice matching. The operations of the process 900 may be implemented by one or more components of a standalone or networked computing system, as described elsewhere herein. For example, the operations of the process 900 may be performed by a speech generation component of system 100 and/or system 500. In some embodiments, one or more components of the computing system may execute a set of instructions to control the functional elements of the system 100 and/or system 500 to perform the described functions. Additionally or alternatively, the one or more components of the computing system may perform aspects of the described functions using special-purpose hardware. In some embodiments, the process 900 may be carried out by optional BCI sensor 109. In some embodiments, the optional BCI sensor 109 may receive input from sensors 107 and use such input to perform process 900.

In operation, the system 100 may detect raw neural signals, preprocess or otherwise filter the detected neural signals, and remove artifacts from the detected neural signals. The system 100 may then perform feature extraction to identify relevant aspects of the signals such as frequency bands (e.g., motor imagery linked to mu and beta rhythms in EEG), firing rates of neurons, and/or spatial patterns. The system 100 may perform feature translation to convert the patterns into commands that a computer can interpret. In some embodiments, the system 100 does not perform signal processing on raw neural signals, but instead receives the BCI produced commands as a basis of detecting neural signals associated with intended speech from the subject. One example command may include triggering commencement of audio from a speaker in the oral cavity based on detected neck or oral cavity movement. Another example command may include modifying a pitch or intonation of audio being produced from a speaker based on movements being performed or attempted by one or more portions of the oral cavity.

At block 902, the process 900 may include detecting, based on a brain-computer interface (BCI) coupled (e.g., attached, implanted, or the like) to the subject, neural signals associated with intended speech from the subject. For example, the signal detection component 108 may include or be coupled to a BCI of the subject. The BCI may be communicatively coupled to the brain of the subject and an external device, such as sensors, microphone(s), and/or speaker(s), of system 100.

The system 100 (e.g., the signal detection component 108) may be a neural detection component that may detect neural signals, interpret the signals, and translate the signals into meaningful outputs for the system 100. One example meaningful output of system 100 is to output excitation signals and/or actual audio speech output from the speaker (s) when the subject is detected to be initiating and/or attempting to speak. The detected neural signals may include electrical signals that indicate movement intention, sensory perception, or other thought indicating action. Example sensors that may be coupled to the BCI include Electroencephalography (EEG) sensors, functional near-infrared spectroscopy (fNIRS) sensors, magnetoencephalography (MEG) sensors, and/or Electrocorticography (ECoG) sensors.

In some embodiments, the process 900 may utilize one or more machine learning model trained to recognized neural patterns associated with any number of predefined phonemes, words, and speech intentions, as a basis in which to detect the neural signals, as described elsewhere herein. In some embodiments, detecting the neural signals may include capturing neural data in time blocks representing about 5 to about 50 milliseconds of neural activity associated with the subject, transforming high-rate neural signals into feature vectors suitable for real-time processing, and maintaining processing latency within a limit that preserves natural speech timing and intonation patterns for the subject, as described elsewhere herein.

At block 904, the process 900 may include decoding intended speech content from the detected neural signals. For example, the system 100 may include an optional BCI sensor device 109 that may be configured to decode intended speech content of a subject by integrating neural signals with peripheral sensor data. The optional BCI sensor device 109 may include electrodes or other neural sensing elements positioned to acquire brain activity associated with speech planning and articulation, such as activity originating from the motor cortex, Broca's area, or auditory regions of the brain. The processor 106 may be operatively coupled to the optional BCI sensor device 109 and may receive the neural activity and execute instructions for processing the acquired signals. The processor 106 may filter the neural data to reduce noise, extract features corresponding to temporal or spatial neural firing patterns, and apply a decoding model trained to associate the features with linguistic elements such as phonemes, words, or sentences. In some embodiments, the processor 106 receives the neural signals from the optional BCI sensor device 109 and performs the decoding of the intended speech content.

To improve decoding accuracy, the processor 106 may also receive auxiliary data from one or more peripheral sensors, such as a microphone and one or more movement sensors. For example, the microphone sensor 107 may capture residual or faint acoustic signals generated during attempted vocalization, while the movement sensors positioned proximate to the throat, jaw, or chest may detect articulatory gestures, respiratory effort, or vibration patterns associated with speech attempts. The processor 106 may integrate the auxiliary data with the neural activity data using sensor fusion techniques, thereby confirming the timing or identity of predicted speech units and/or excitation signal and refining the reconstructed output.

At block 906, the process 900 may include predicting, based on the decoded intended speech content, an excitation signal for use in producing speech corresponding to the intended speech content. For example, the signal prediction component 112 may predict upcoming excitation signals, as described in FIGS. 7 and 8 herein. In some embodiments, predicting the excitation signals may include automatically adjusting a fundamental frequency of the variable excitation signal at predetermined time intervals of about 5 milliseconds to about 50 milliseconds to capture natural intonation patterns associated with the intended speech content.

At block 908, the process 900 may include generating, based on the predicted excitation signal, a variable excitation signal that automatically changes over time to match intonation patterns associated with the intended speech content. For example, the excitation signal generation component 114 may generate the variable excitation signal, as described in FIGS. 7 and 8 herein. In some embodiments, the generated variable excitation signal includes multiple harmonic components configured to simulate spectral characteristics of natural vocal fold vibration for particular intended speech content.

At block 910, the process 900 may include causing, based on the variable excitation signal, intelligible speech output corresponding to the intended speech content. The intelligible speech output may include the intended speech acoustically shaped according to one or more voice characteristics in banked speech audio recordings of the subject. For example, the speech production component 116 may cause intelligible speech to be generated and sent to the intraoral speaker component 126 for playback. For example, causing the intelligible speech output may include emission of the produced speech as output through an intraoral speaker (e.g., intraoral speaker component 126) provided in an oral cavity of the subject. In this manner, the subject may generate naturalistic verbal communication even in the absence of physical speech capability. Additionally, the audible output may provide feedback to the user, enabling adaptation of neural activity through neuroplastic processes and improving the performance of the decoding, excitation prediction, and audio generation over time.

In some embodiments, the process 900 further includes comparing the intelligible speech output with predefined speech characteristics corresponding to the intended speech content and the banked speech audio recordings, and adjusting the generated variable excitation signal based on the comparing to ensure the speech substantially matches the predefined speech characteristics.

Figure 10:
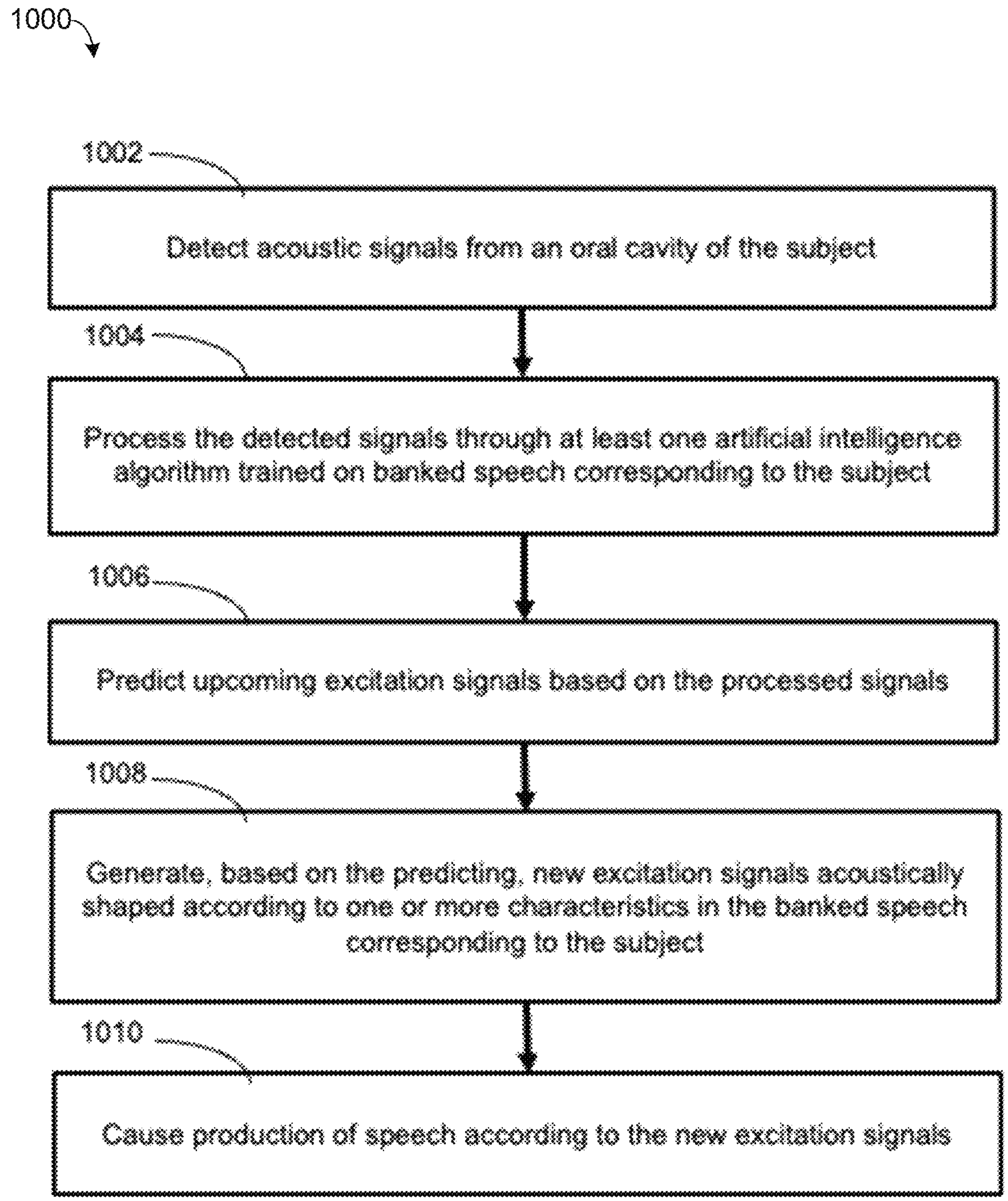
FIG. 10 illustrates a flow diagram of an example process for generating a personalized excitation signal for a subject.

FIG. 10 illustrates a flow diagram of an example process 1000 for generating a personalized excitation signal for a subject. The process 1000 may be performed using real-time intonation and voice matching techniques. The operations of the process 1000 may be implemented by one or more components of a standalone or networked computing system, as described elsewhere herein. For example, the operations of the process 1000 may be performed by a speech generation component of system 100 and/or system 500. In some embodiments, one or more components of the computing system may execute a set of instructions to control the functional elements of the component(s) to perform the described functions. Additionally or alternatively, the one or more components of the computing system may perform aspects of the described functions using special-purpose hardware.

At block 1002, the process 1000 may include detecting acoustic signals from an oral cavity of a subject. For example, the system 100 may use the signal detection component 108 and one or more microphones positioned on a subject to detect acoustic signals generated during speech attempts by the subject. In some embodiments, the one or more microphones may be positioned within a predetermined range of the oral cavity to capture acoustic signals with sufficient clarity. For example, one or more microphones may be positioned on one or more of: a neck region, a jaw region, an ear or ear canal region, a check region, or the like. In some embodiments, the one or more microphones may incorporate noise-canceling technology to reduce interference from ambient sounds.

In some embodiments, detecting the acoustic signals from the oral cavity may be performed by a sensing system that includes: a microphone positioned to detect acoustic signals from speech attempts performed by the subject, and at least one sensor positioned on the subject to detect physiological indicators of speech initiation.

At block 1004, the process 1000 may include processing the detected signals through at least one AI algorithm trained on banked speech corresponding to the subject, as described in FIGS. 3 through 8 herein. In a non-limiting example, the at least one sensor may be positioned in a neck region or a jaw region on the subject. The at least one sensor may be configured to detect movement associated with one or more anatomical structures of the oral cavity of the subject, and generate control signals for activating and deactivating a speaker and a microphone. The speaker and the microphone may be within a predetermined range of the neck region or the jaw region of the subject.

At block 1006, the process 1000 may include predicting upcoming excitation signals based on the processed signals, as described in FIGS. 7 and 8 herein. The predicting may include processing the signals in temporal segments and determining excitation signal parameters for subsequent temporal segments, as described at least in FIG. 7 herein. In some embodiments, predicting the upcoming excitation signals may include comparing the detected acoustic signals to one or more characteristics in the banked speech corresponding to the subject and minimizing differences between the generated speech and the one or more characteristics in the banked speech corresponding to the subject. The one or more characteristics may include at least one of: audio characteristics in voice recordings captured from the subject prior to a medical procedure, and voice characteristics selected from a voice library.

At block 1008, the process 1000 may include generating, based on the predicting, new excitation signals acoustically shaped according to one or more characteristics in the banked speech corresponding to the subject, as described elsewhere herein.

At block 1010, the process 1000 may include causing production of speech according to the new excitation signals. The produced speech is generated to substantially match patterns and intonation in the banked speech. In some embodiments, causing the production of speech includes emission of the produced speech as output through an intraoral speaker provided in the oral cavity of the subject.

The systems and methods described herein and variations thereof can be embodied and/or implemented at least in part as a machine configured to receive a computer-readable medium storing computer-readable instructions. The instructions may be executed by computer-executable components integrated with the system 100 and one or more portions of the processor 106 on the assemblies described herein and/or computing devices 102. The computer-readable medium can be stored on any suitable computer-readable media such as RAMs, ROMs, flash memory, EEPROMs, optical devices (e.g., CD or DVD), hard drives, floppy drives, or any suitable device. The computer-executable component may include any suitable dedicated hardware or hardware/firmware combination that can alternatively or additionally execute the instructions. In some embodiments, the computer-readable instructions and the processor 106 may be on a microphone device, a speaker device, or a sensor device and may carry out the steps of the algorithms described herein.

References in the specification to "one embodiment," "an embodiment," "an illustrative embodiment," "some embodiments," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used in the description and claims, the singular form "a", "an" and "the" include both singular and plural references unless the context clearly dictates otherwise. For example, the term "sensor" may include, and is contemplated to include, a plurality of sensors. At times, the claims and disclosure may include terms such as "a plurality," "one or more," or "at least one;" however, the absence of such terms is not intended to mean, and should not be interpreted to mean, that a plurality is not conceived.

The term "about" or "approximately," when used before a numerical designation or range (e.g., to define a length or pressure), indicates approximations which may vary by (+) or (−) 5%, 1% or 0.1%. All numerical ranges provided herein are inclusive of the stated start and end numbers. The term "substantially" indicates mostly (i.e., greater than 50%) or essentially all of a device, substance, or composition.

As used herein, the term "comprising" or "comprises" is intended to mean that the devices, systems, and methods include the recited elements, and may additionally include any other elements. "Consisting essentially of" shall mean that the devices, systems, and methods include the recited elements and exclude other elements of essential significance to the combination for the stated purpose. Thus, a system or method consisting essentially of the elements as defined herein would not exclude other materials, features, or steps that do not materially affect the basic and novel characteristic(s) of the claimed disclosure. "Consisting of" shall mean that the devices, systems, and methods include the recited elements and exclude anything more than a trivial or inconsequential element or step. Embodiments defined by each of these transitional terms are within the scope of this disclosure.

The examples and illustrations included herein show, by way of illustration and not of limitation, specific embodiments in which the subject matter may be practiced. Other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A speech synthesis system comprising:

at least one microphone;

a speaker configured to be positioned within an oral cavity of a subject;

a sensing system configured to detect speech-related signals;

at least one processor operatively coupled to the sensing system, the speaker, and memory storing processor-executable instructions, which when executed by the processor, cause the processor to:

detect, using the sensing system, speech-related signals emanating from the subject;

generate, based on the detected speech-related signals emanating from the subject, a variable excitation signal, the generating comprising:

automatically varying an excitation signal over time and predicting an upcoming trajectory of fundamental frequencies associated with the excitation signal, and adjusting the predicted fundamental frequencies associated with the excitation signal at predetermined time intervals to capture natural intonation patterns for the subject;

shape the generated variable excitation signal according to previously stored speech recordings, the shaping comprising comparing the generated variable excitation signal to match one or more voice characteristics in the previously stored speech recordings; and cause, from the speaker and based on the shaped variable excitation signal, produced speech content that approximates the matched one or more voice characteristics in the previously stored speech recordings.

2. The system of claim 1, wherein the speaker is a straw conduit configured to audibly transmit the produced speech content into the oral cavity of the subject.

3. The system of claim 1, wherein predicting the upcoming trajectory comprises:

using a first machine learning model to predict an initial excitation state corresponding to a state of the trajectory of one or more of the predicted fundamental frequencies, the states comprising an inactive state, an unvoiced state, and a voiced state; and using a second machine learning model to predict a pitch sequence when the excitation state is predicted to be voiced.

4. The system of claim 1, predicting the upcoming trajectory comprises determining upcoming time periods in which the variable excitation signal is to include white noise with a lack of a fundamental frequency.

5. The system of claim 1, wherein the at least one microphone is positioned to detect acoustic signals from speech attempts performed by the subject, and wherein the system further comprises:

at least one sensor positioned on the subject to detect physiological indicators of speech initiation.

6. The system of claim 5, wherein the at least one sensor is configured to detect movement associated with one or more anatomical structures of the subject and generate control signals for activating and deactivating the speaker and the at least one microphone.

7. The system of claim 1, wherein the predetermined time intervals are about 5 milliseconds to about 50 milliseconds.

8. The system of claim 1, wherein the previously stored speech recordings correspond to one or more of:

digital audio recordings of speech produced by the subject, digital audio recordings of speech produced by subjects other than the subject, a combination of the digital audio recordings of speech produced by the subject and the digital audio recordings of speech produced by subjects other than the subject.

9. A computer-implemented method for generating a personalized excitation signal for a subject, the method comprising:

detecting acoustic signals from an oral cavity of the subject;

processing the detected signals through at least one artificial intelligence algorithm trained on banked speech corresponding to the subject;

predicting upcoming excitation signals based on the processed signals, the predicting comprising processing the signals in temporal segments and determining excitation signal parameters for subsequent temporal segments;

generating, based on the predicting, new excitation signals acoustically shaped according to one or more characteristics in the banked speech corresponding to the subject; and causing production of speech according to the new excitation signals, wherein the produced speech substantially matches patterns and intonation in the banked speech.

10. The computer-implemented method of claim 9, wherein causing the production of speech comprises emission of the produced speech as output through an intraoral speaker provided in the oral cavity of the subject.

11. The computer-implemented method of claim 9, wherein predicting the upcoming excitation signals comprises:

comparing the detected acoustic signals to one or more characteristics in the banked speech corresponding to the subject; and minimizing differences between the generated speech and the one or more characteristics in the banked speech corresponding to the subject.

12. The computer-implemented method of claim 11, wherein the one or more characteristics comprise at least one of:

audio characteristics in voice recordings captured from the subject prior to a medical procedure; and voice characteristics selected from a voice library.

13. The computer-implemented method of claim 9, wherein detecting the acoustic signals from the oral cavity are performed by a sensing system comprising:

a microphone positioned to detect acoustic signals from speech attempts performed by the subject; and at least one sensor positioned on the subject to detect physiological indicators of speech initiation.

14. The computer-implemented method of claim 13, wherein the at least one sensor is positioned in a neck region or a jaw region on the subject, the at least one sensor being configured to detect movement associated with one or more anatomical structures of the oral cavity of the subject, and generate control signals for activating and deactivating a speaker and a microphone, wherein the speaker and the microphone are within a predetermined range of the neck region or the jaw region of the subject.

15. A computer-implemented method for generating speech from brain signals of a subject, the method comprising:

detecting, based on a brain-computer interface coupled to the subject, neural signals associated with intended speech from the subject;

decoding intended speech content from the detected neural signals;

predicting, based on the decoded intended speech content, an excitation signal for use in producing speech corresponding to the intended speech content;

generating, based on the predicted excitation signal, a variable excitation signal that automatically changes over time to match intonation patterns associated with the intended speech content; and causing, based on the variable excitation signal, intelligible speech output corresponding to the intended speech content, wherein the intelligible speech output comprises the intended speech acoustically shaped according to one or more voice characteristics in banked speech audio recordings of the subject.

16. The computer-implemented method of claim 15, wherein detecting the neural signals comprises utilizing a machine learning model trained to recognize neural patterns associated with a plurality of predefined phonemes, words, and speech intentions.

17. The computer-implemented method of claim 15, wherein detecting the neural signals comprises:

capturing neural data in time blocks representing about 5 to about 50 milliseconds of neural activity associated with the subject;

transforming high-rate neural signals into feature vectors suitable for real-time processing; and maintaining processing latency within a limit that preserves natural speech timing and intonation patterns for the subject.

18. The computer-implemented method of claim 15, wherein the generated variable excitation signal comprises multiple harmonic components configured to simulate spectral characteristics of natural vocal fold vibration for the intended speech content.

19. The computer-implemented method of claim 15, further comprising:

comparing the intelligible speech output with predefined speech characteristics corresponding to the intended speech content and the banked speech audio recordings; and adjusting the generated variable excitation signal based on the comparing.

20. The computer-implemented method of claim 15, wherein predicting the excitation signals comprises:

automatically adjusting a fundamental frequency of the variable excitation signal at predetermined time intervals of about 5 milliseconds to about 50 milliseconds to capture natural intonation patterns associated with the intended speech content.

21. The computer-implemented method of claim 15, wherein causing the intelligible speech output comprises emission of the produced speech as output through an intraoral speaker provided in an oral cavity of the subject.

* * * * *